(12) United States Patent
Day et al.

(10) Patent No.: US 9,776,330 B2
(45) Date of Patent: Oct. 3, 2017

(54) CRAWLER ROBOT AND SUPPORTING PLATFORM

(71) Applicant: The Boeing Company, Chicago, IL (US)

(72) Inventors: Dan Dresskell Day, Seattle, WA (US); Kenneth P. Zaballos, Burien, WA (US); Paul C. Chang, Woodinville, WA (US); Darrell Darwin Jones, Mill Creek, WA (US); David P. Banks, Lake Stevens, WA (US); Paul G. Kostenick, Marysville, WA (US); Kerri L. Olson, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/558,850

(22) Filed: Dec. 3, 2014

(65) Prior Publication Data

US 2015/0314446 A1 Nov. 5, 2015

Related U.S. Application Data

(60) Provisional application No. 61/986,766, filed on Apr. 30, 2014.

(51) Int. Cl.
*G01C 22/00* (2006.01)
*B25J 9/16* (2006.01)
(Continued)

(52) U.S. Cl.
CPC .......... *B25J 9/1687* (2013.01); *B23Q 9/0007* (2013.01); *B25J 5/007* (2013.01); *B25J 5/04* (2013.01);
(Continued)

(58) Field of Classification Search
CPC ... B25J 9/1687; B25J 5/007; B25J 5/04; B25J 5/0052; B23Q 9/0007; B23Q 7/04; B64F 5/0009; G05B 19/182
See application file for complete search history.

(56) References Cited

U.S. PATENT DOCUMENTS 4,006,650 A 2/1977 Elmer
4,108,566 A * 8/1978 Jones .................. B23B 39/26
408/115 R
(Continued)

FOREIGN PATENT DOCUMENTS

CA 2497249 A1 8/2006
CA 2553747 C 7/2013
(Continued)

OTHER PUBLICATIONS

Spishak et al., "Magnet Sensing Hole Driller and Method Therefor," U.S. Appl. No. 13/931,165, filed Jun. 28, 2013, 33 pages.
(Continued)

*Primary Examiner* — Ian Jen
(74) *Attorney, Agent, or Firm* — Yee & Associates, P.C.

(57) ABSTRACT

A method and apparatus for installing a fastener in a surface of a structure. A crawler robot may comprise a first movement system and a second movement system. The first movement system may be configured to move the crawler robot and a track system along the surface. The second movement system may be configured to move the crawler robot along the track system on the surface.

32 Claims, 16 Drawing Sheets

(51) Int. Cl.
- *B25J 15/00* (2006.01)
- *B25J 5/00* (2006.01)
- *B25J 5/04* (2006.01)
- *G05B 19/18* (2006.01)
- *B23Q 9/00* (2006.01)
- *B64F 5/10* (2017.01)
- *B23Q 7/04* (2006.01)

(52) U.S. Cl.
CPC ............. B25J 15/0052 (2013.01); B64F 5/10 (2017.01); G05B 19/182 (2013.01); *B23Q 7/04* (2013.01); *B23Q 2210/008* (2013.01); *G05B 2219/45059* (2013.01); *Y10S 901/01* (2013.01); *Y10S 901/41* (2013.01); *Y10S 901/44* (2013.01)

(56) References Cited

U.S. PATENT DOCUMENTS

| | | | |
|---|---|---|---|
| 4,148,401 A | | 4/1979 | Kautetzky |
| 4,445,588 A | | 5/1984 | Truninger |
| 4,477,216 A | | 10/1984 | Van De Motter et al. |
| 4,483,080 A | * | 11/1984 | Knoll ............... G01B 11/26 33/286 |
| 4,599,018 A | * | 7/1986 | Woods ............... B23B 41/006 408/1 R |
| 4,674,949 A | * | 6/1987 | Kroczynski ............ B25J 5/00 114/222 |
| 4,710,086 A | | 12/1987 | Naaktgeboren et al. |
| 4,781,517 A | | 11/1988 | Pearce et al. |
| 4,850,763 A | * | 7/1989 | Jack ............... B23Q 35/02 408/88 |
| 4,940,382 A | * | 7/1990 | Castelain ............ B62D 57/00 114/222 |
| 5,022,542 A | | 6/1991 | Beier |
| 5,150,506 A | | 9/1992 | Kotake et al. |
| 5,326,201 A | | 7/1994 | King |
| 5,351,626 A | * | 10/1994 | Yanagisawa ........ B62D 57/032 180/164 |
| 5,390,128 A | | 2/1995 | Ryan et al. |
| 5,407,415 A | | 4/1995 | Spishak |
| 5,468,099 A | * | 11/1995 | Wheetley ........... B23B 39/04 180/8.1 |
| 5,526,203 A | | 6/1996 | Mohajerani et al. |
| 5,564,655 A | | 10/1996 | Garland et al. |
| 5,646,870 A | | 7/1997 | Krivokapic et al. |
| 5,653,351 A | | 8/1997 | Grout et al. |
| 5,709,026 A | | 1/1998 | Veselaski et al. |
| 5,715,729 A | | 2/1998 | Toyama et al. |
| 5,761,064 A | | 6/1998 | La et al. |
| 5,822,877 A | | 10/1998 | Dai |
| 5,920,394 A | * | 7/1999 | Gelbart ............... G01S 17/66 356/615 |
| 6,098,260 A | | 8/2000 | Sarh |
| 6,230,382 B1 | | 5/2001 | Cunningham et al. |
| 6,779,272 B2 | * | 8/2004 | Day ............... B64F 5/10 29/407.01 |
| 6,843,328 B2 | * | 1/2005 | Boyl-Davis ............ B23Q 1/26 173/31 |
| 6,862,912 B2 | | 3/2005 | Olsson |
| 6,871,524 B2 | | 3/2005 | Olsson |
| 6,926,094 B2 | * | 8/2005 | Arntson .............. B23B 39/18 173/31 |
| 6,961,626 B1 | | 11/2005 | Paik |
| 7,168,898 B2 | | 1/2007 | Hamann |
| 7,249,943 B2 | | 7/2007 | Benson et al. |
| 7,273,333 B2 | * | 9/2007 | Buttrick, Jr. ........ B23Q 9/0042 408/1 R |
| 7,406,758 B2 | * | 8/2008 | Jones ............... B23Q 9/0014 248/205.5 |
| 7,614,154 B2 | * | 11/2009 | Cobb ............... B64F 5/10 33/1 BB |
| 8,005,563 B2 | | 8/2011 | Cobb et al. |
| 8,299,118 B2 | | 10/2012 | Chang et al. |
| 8,539,658 B2 | | 9/2013 | Munk |
| 8,606,388 B2 | | 12/2013 | Cobb et al. |
| 8,620,470 B2 | | 12/2013 | Cobb et al. |
| 8,661,684 B1 | | 3/2014 | Boyd et al. |
| 8,763,953 B2 | | 7/2014 | Sakurai et al. |
| 8,790,050 B2 | * | 7/2014 | Marguet ............... B21J 15/14 408/1 R |
| 9,090,357 B2 | | 7/2015 | Oberoi et al. |
| 9,205,933 B2 | | 12/2015 | Oberoi et al. |
| 9,299,118 B1 | | 3/2016 | McGraw |
| 2002/0066192 A1 | * | 6/2002 | Cunningham ........ G01B 11/002 33/286 |
| 2003/0043964 A1 | | 3/2003 | Sorenson |
| 2003/0097198 A1 | | 5/2003 | Sonderman et al. |
| 2003/0149502 A1 | | 8/2003 | Rebello et al. |
| 2004/0039465 A1 | | 2/2004 | Boyer et al. |
| 2005/0036879 A1 | | 2/2005 | Jhaveri et al. |
| 2005/0049126 A1 | | 3/2005 | Everson et al. |
| 2005/0172470 A1 | * | 8/2005 | Cobb ............... G05B 19/41805 29/407.1 |
| 2005/0223549 A1 | | 10/2005 | Braun |
| 2006/0108470 A1 | * | 5/2006 | McCrary ............ B62D 55/062 244/50 |
| 2007/0029877 A1 | * | 2/2007 | Longley ............... B65G 7/02 305/120 |
| 2007/0180674 A1 | | 8/2007 | Morden et al. |
| 2008/0077276 A1 | * | 3/2008 | Montero Sanjuan .... B21J 15/14 700/245 |
| 2008/0155807 A1 | | 7/2008 | Toh et al. |
| 2008/0205763 A1 | | 8/2008 | Marsh et al. |
| 2009/0112349 A1 | * | 4/2009 | Cobb ............... B64F 5/10 700/114 |
| 2010/0025349 A1 | | 2/2010 | Khoshnevis |
| 2010/0151364 A1 | | 6/2010 | Ye et al. |
| 2010/0180711 A1 | | 7/2010 | Kilibarda et al. |
| 2010/0204817 A1 | | 8/2010 | Fujita |
| 2010/0217437 A1 | | 8/2010 | Sarh et al. |
| 2011/0010007 A1 | | 1/2011 | Sarh et al. |
| 2011/0054694 A1 | * | 3/2011 | Munk ............... B25B 11/02 700/275 |
| 2011/0132548 A1 | | 6/2011 | De Mattia |
| 2011/0178727 A1 | * | 7/2011 | Hafenrichter ....... G01M 5/0016 702/38 |
| 2011/0214586 A1 | | 9/2011 | Wessel et al. |
| 2012/0014759 A1 | * | 1/2012 | Sarh .................. B62D 57/024 408/76 |
| 2012/0210802 A1 | | 8/2012 | Sarh et al. |
| 2013/0014368 A1 | | 1/2013 | Woods et al. |
| 2013/0018525 A1 | | 1/2013 | Jang et al. |
| 2013/0145850 A1 | | 6/2013 | Lute, Jr. et al. |
| 2013/0152397 A1 | | 6/2013 | Oberoi et al. |
| 2013/0158697 A1 | * | 6/2013 | Stone ............... B64F 5/0036 700/114 |
| 2013/0226340 A1 | | 8/2013 | Buchstab |
| 2014/0157588 A1 | | 6/2014 | Boyd et al. |
| 2014/0277717 A1 | | 9/2014 | Jung et al. |
| 2014/0305217 A1 | | 10/2014 | Tapia et al. |
| 2014/0340509 A1 | | 11/2014 | Fairbairn |
| 2015/0135535 A1 | | 5/2015 | Hallam et al. |
| 2015/0266147 A1 | | 9/2015 | Reid et al. |
| 2016/0128656 A1 | | 5/2016 | Gregerson et al. |

FOREIGN PATENT DOCUMENTS

| | | |
|---|---|---|
| DE | 102008041190 A1 | 3/2010 |
| EP | 1227316 A2 | 7/2002 |
| EP | 1884453 A2 | 2/2008 |
| EP | 2108515 A1 | 10/2009 |
| EP | 2221151 A2 | 8/2010 |
| EP | 2631041 A2 | 8/2013 |
| EP | 2792431 A1 | 10/2014 |
| GB | 2095215 A | 9/1982 |
| GB | 2329138 A | 3/1999 |
| GB | 2473100 A | 3/2011 |
| GB | 2498977 A | 8/2013 |

(56) References Cited

FOREIGN PATENT DOCUMENTS

| WO | WO2010018340 A2 | 2/2010 |
| WO | WO2014193602 A2 | 12/2014 |

OTHER PUBLICATIONS

Larson et al., "Modular Stanchion System," U.S. Appl. No. 13/926,646, filed Jun. 25, 2013, 31 pages.
Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Cobb et al., "Metrology System for Positioning Assemblies," U.S. Appl. No. 14/559,034, filed Dec. 3, 2014, 84 pages.
Desjardien et al., "Apparatus, System, and Method for Supporting a Wing Assembly," U.S. Appl. No. 14/558,834, filed Dec. 3, 2014, 88 pages.
Reid et al., "System and Method for Positioning an Automated Assembly Tool Relative to a Structure," U.S. Appl. No. 14/558,853, filed Dec. 3, 2014, 128 pages.
Reid et al., "Mobile Automated Assembly Tool for Aircraft Structures," U.S. Appl. No. 14/558,859, filed Dec. 3, 2014, 76 pages.
Day et al., "Flexible Manufacturing System for Aircraft Structures," U.S. Appl. No. 14/558,867, filed Dec. 3, 2014, 153 pages.
Desjardien et al., "Mobile Automated Overhead Assembly Tool for Aircraft Structures," U.S. Appl. No. 14/558,899, filed Dec. 3, 2014, 100 pages.
Extended European Search Report, dated Sep. 22, 2015, regarding Application No. EP14196571.5, 8 pages.
Partial European Search Report, dated Sep. 30, 2015, regarding Application No. EP14196480.9, 6 pages.
Extended European Search Report, dated Oct. 2, 2015, regarding Application No. EP14196553.3, 7 pages.
Office Action, dated May 12, 2016, regarding U.S. Appl. No. 14/558,899, 35 pages.
Office Action, dated May 12, 2016, regarding U.S. Appl. No. 14/558,859, 27 pages.
Extended European Search Report, dated Jan. 27, 2016, regarding Application No. EP14196480.9, 10 pages.
Extended European Search Report, dated Apr. 8, 2016, regarding Application No. EP14196494.0, 6 pages.
Extended European Search Report, dated May 2, 2016, regarding Application No. EP14196483.3, 7 pages.
Extended European Search Report, dated May 2, 2016, regarding Application No. EP14196468.4, 7 pages.
Extended European Search Report, dated May 3, 2016, regarding Application No. EP14196548.3, 7 pages.
Notice of Allowance, dated Jul. 7, 2016, regarding U.S. Appl. No. 14/558,859, 29 pages.
Final Office Action, dated Nov. 17, 2016, regarding U.S. Appl. No. 14/558,899, 36 pages.
Notice of Allowance, dated Feb. 27, 2017, regarding U.S. Appl. No. 14/558,899, 13 pages.
Office Action, dated May 3, 2017, regarding U.S. Appl. No. 14/559,034, 55 pages.
Canadian Intellectual Property Office Search Report, dated Feb. 24, 2017, regarding Application No. 2,883,614, 17 pages.
Canadian Intellectual Property Office Search Report, dated Feb. 23, 2017, regarding Application No. 2,896,059, 11 pages.
Canadian Intellectual Property Office Office Action, dated Mar. 1, 2017, regarding Application No. 2,882,420, 7 pages.
Canadian Intellectual Property Office Office Action, dated Mar. 31, 2017, regarding Application No. 2,882,466, 20 pages.
Canadian Intellectual Property Office Office Action, dated Mar. 30, 2017, regarding Application No. 2,882,4485, 17 pages.
Canadian Intellectual Property Office Office Action, dated Apr. 25, 2017, regarding Application No. 2,886,500, 19 pages.

* cited by examiner

US 9,776,330 B2

CRAWLER ROBOT AND SUPPORTING PLATFORM

RELATED PROVISIONAL APPLICATION

This application claims the benefit of U.S. Provisional Patent Application Ser. No. 61/986,766, filed Apr. 30, 2014, and entitled "Crawler Robot and Supporting Platform."

CROSS-REFERENCE TO RELATED APPLICATIONS

This application is related to the following patent applications: entitled "Mobile Automated Overhead Assembly Tool for Aircraft Structures," Ser. No. 14/558,899, entitled "Mobile Automated Assembly Tool for Aircraft Structures," Ser. No. 14/558,859, entitled "Metrology System for Positioning Assemblies," Ser. No. 14/559,034, entitled "Flexible Manufacturing System for Aircraft Structures," Ser. No. 14/558,867, entitled "System and Method for Positioning an Automated Assembly Tool Relative to a Structure," Ser. No. 14/558,853, and entitled "Apparatus, System, and Method for Supporting a Wing Assembly," Ser. No. 14/558,834, filed of even date herewith, each assigned to the same assignee, and each incorporated herein by reference in its entirety.

BACKGROUND INFORMATION

1. Field

The present disclosure relates generally to aircraft structures and, in particular, to manufacturing aircraft structures. Still more particularly, the present disclosure relates to a method and apparatus for manufacturing aircraft structures using a crawler robot and a supporting platform.

2. Background

Various parts may be manufactured and assembled to form different aircraft structures for an aircraft. For example, without limitation, ribs, stringers, and spars may be assembled together to form a wing structure for a wing of an aircraft. Skin panels may then be placed over the wing structure and secured to the structure to form the wing. Assembly of an aircraft structure may include, for example, without limitation, drilling one or more holes through multiple parts and installing fasteners through these holes to secure the parts to each other.

Some currently available methods for drilling holes in the final assembly of an aircraft structure may be manual and require human operators, such as aircraft mechanics. In some cases, these aircraft mechanics may need to be positioned in difficult to access areas around or in the structure to perform drilling using handheld power tools. This type of process may be more tedious, exacting, and time consuming than desired.

Other currently available methods may use automated drilling systems for performing drilling operations. However, some of these automated drilling systems may be larger in size and heavier than desired. The larger size of these automated drilling systems may make the movement of aircraft mechanics within and around the area in which these systems are located more difficult than desired, especially while the automated drilling systems are in use. Consequently, these aircraft mechanics may be unable to perform other tasks or operations until the drilling operations have been completed for a particular area. These delays may increase the overall time required for assembly of an aircraft structure more than desired. Therefore, it would be desirable to have a method and apparatus that take into account at least some of the issues discussed above, as well as other possible issues.

SUMMARY

An illustrative embodiment of the present disclosure may provide a crawler robot. The crawler robot may comprise a first movement system and a second movement system. The first movement system may be configured to move the crawler robot and a track system along a surface. The second movement system may be configured to move the crawler robot along the track system on the surface.

Another illustrative embodiment of the present disclosure may provide an apparatus. The apparatus may comprise a track system and a crawler robot. The crawler robot may comprise a first movement system and a second movement system. The first movement system may be configured to move the crawler robot and the track system along a surface of a structure. The second movement system may be configured to move the crawler robot along the track system on the surface.

Yet another illustrative embodiment of the present disclosure may provide a method for installing a fastener in a surface of a structure. A crawler robot and a track system may be moved along the surface to position the crawler robot within a selected region on the surface. The track system may be coupled to the surface. The crawler robot may be moved relative to the track system to precisely move the crawler robot to a desired position within the selected region.

A further illustrative embodiment of the present disclosure may provide a method. A crawler robot and a track system may be moved along a surface using a first movement system of the crawler robot. The track system may be coupled to the surface. The first movement system of the crawler robot may be retracted. The crawler robot may be moved along the track system using a second movement system of the crawler robot.

Yet a further illustrative embodiment of the present disclosure may provide a crawler robot. The crawler robot may comprise a first movement system, a second movement system, a drilling system, an inspection system, a fastener system, and a positioning system. The first movement system may be configured to move the crawler robot and a track system along a surface, the first movement system comprising retractable wheels. The second movement system may be configured to move the crawler robot along the track system on the surface. The drilling system may comprise an interchangeable tool holder. The inspection system may be configured to inspect a hole drilled by the drilling system, the inspection system comprising an interchangeable probe. The fastener system may be configured to insert a fastener into the hole drilled by the drilling system. The positioning system may be configured to identify a desired position of the crawler robot on the surface based on index features of the surface.

Another illustrative embodiment of the present disclosure may provide a method. A crawler robot and a track system may be placed on a surface using a pick and place arm. The crawler robot and the track system may be moved along the surface using a first movement system of the crawler robot. The track system may be coupled to the surface by pulling a vacuum in suction cups of the track system. The first movement system of the crawler robot may be retracted. The crawler robot may be moved along the track system on the surface using a second movement system of the crawler robot. Utility cables attached to the crawler robot may be moved using a utility arm as the crawler robot moves along the surface. A position of the crawler robot on the surface may be verified using a positioning system of the crawler robot. A hole may be drilled in the surface using a drilling system of the crawler robot. At least one of a diameter, a countersink depth, a countersink diameter, or a grip length of the hole may be inspected using an inspection system of the crawler robot. A fastener may be inserted into the hole using a fastener system of the crawler robot.

Yet a further illustrative embodiment of the present disclosure may provide an apparatus. The apparatus may comprise a track system, a crawler robot, and a crawler support. The crawler robot may comprise a first movement system configured to move the crawler robot and the track system along a surface of a structure and a second movement system configured to move the crawler robot along the track system on the surface of the structure. The crawler support may comprise a movable platform, a movement system, a pick and place arm, and a utility arm.

Another illustrative embodiment of the present disclosure may provide a method for managing a crawler robot and a track system using a crawler support. The crawler support may comprise moving the crawler support within a manufacturing environment containing a structure using a movable platform such that a pick and place arm associated with the movable platform is within reach of a surface of the structure. The crawler support may further comprise placing the crawler robot and the track system onto the surface of the structure using the pick and place arm associated with the movable platform. The crawler support may further comprise moving the crawler robot and the track system along the surface using a first movement system of the crawler robot. The crawler support may still further comprise coupling the track system to the surface. The crawler support may further comprise retracting the first movement system of the crawler robot and moving the crawler robot along the track system using a second movement system of the crawler robot.

Yet a further illustrative embodiment of the present disclosure may provide an apparatus. The apparatus may comprise a crawler robot configured to move along a surface of a structure and a crawler support. The crawler support may comprise a movable platform, a movement system, a pick and place arm, and a utility arm configured to support the crawler robot.

Another illustrative embodiment of the present disclosure may provide a method of operating a crawler support. The crawler support may be moved within a manufacturing environment containing a structure using a movable platform such that a pick and place arm associated with the movable platform is within reach of a surface of the structure. A crawler robot may be placed onto the surface of the structure using the pick and place arm associated with the movable platform. A utility arm of the crawler support may be moved as the crawler robot moves along the surface of the structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to have other functionalities, in addition to drilling functions, on one crawler robot. In particular, the illustrative embodiments recognize and take into account that it may be desirable to have metrology functionality, inspection functionality, fastener insertion functionality, or some combination thereof in addition to drilling functionality on a crawler robot.

Further, the illustrative embodiments recognize and take into account that having a movable platform capable of supporting a crawler robot across the whole of an aircraft wing may be desirable. The illustrative embodiments recognize and take into account that it may be desirable to have a movable platform capable of positioning a crawler robot such that the various tools on the crawler robot used to provide the different functionalities of the crawler robot may be positioned with a desired level of accuracy. Thus, the illustrative embodiments provide a crawler robot having multiple functionalities and a track system for use in moving the crawler robot.

Figure 1:
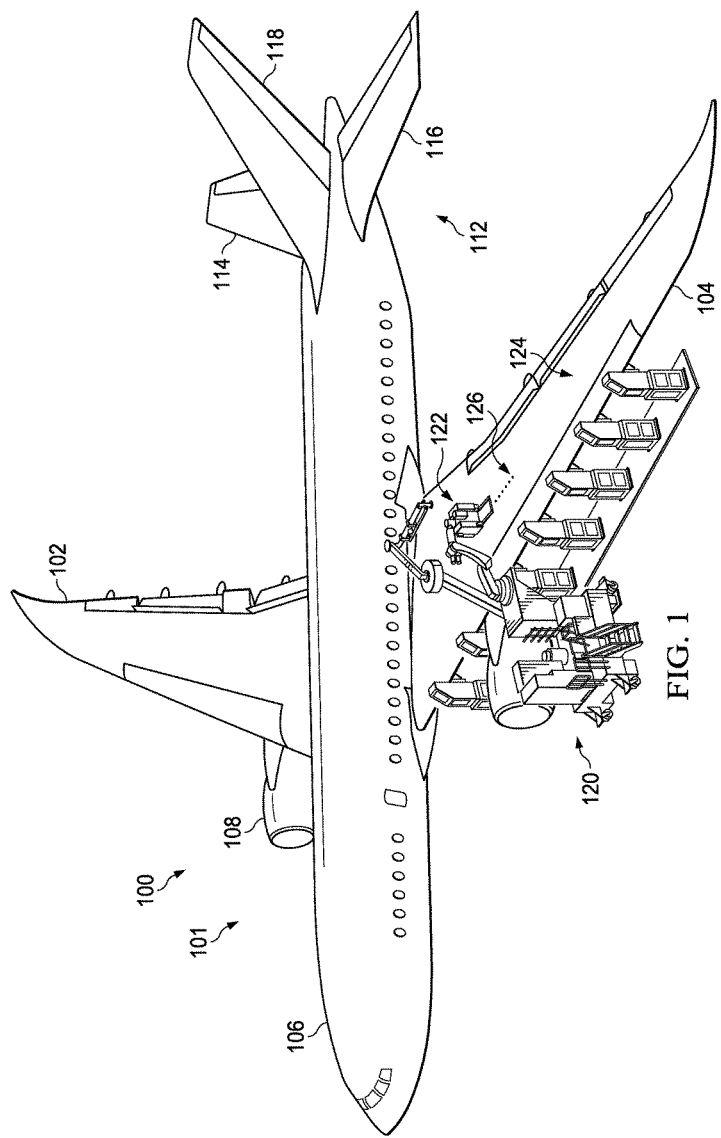
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 is manufactured in manufacturing environment 101. As depicted, aircraft 100 may have wing 102 and wing 104 attached to body 106. Aircraft 100 may include engine 108 attached to wing 102.

Body 106 may have tail section 112. Horizontal stabilizer 114, horizontal stabilizer 116, and vertical stabilizer 118 may be attached to tail section 112 of body 106.

As depicted, platform 120 may be positioned adjacent to wing 104. Crawler robot 122 may be positioned on skin panel 124 of wing 104. Platform 120 may support crawler robot 122 by providing utilities to crawler robot 122. In some illustrative examples, platform 120 may be a movable platform. Crawler robot 122 may travel along skin panel 124. Crawler robot 122 may form holes 126 in skin panel 124 of wing 104.

This illustration of aircraft 100 is provided for purposes of illustrating one environment in which the different illustrative embodiments may be implemented. The illustration of aircraft 100 in FIG. 1 is not meant to imply architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
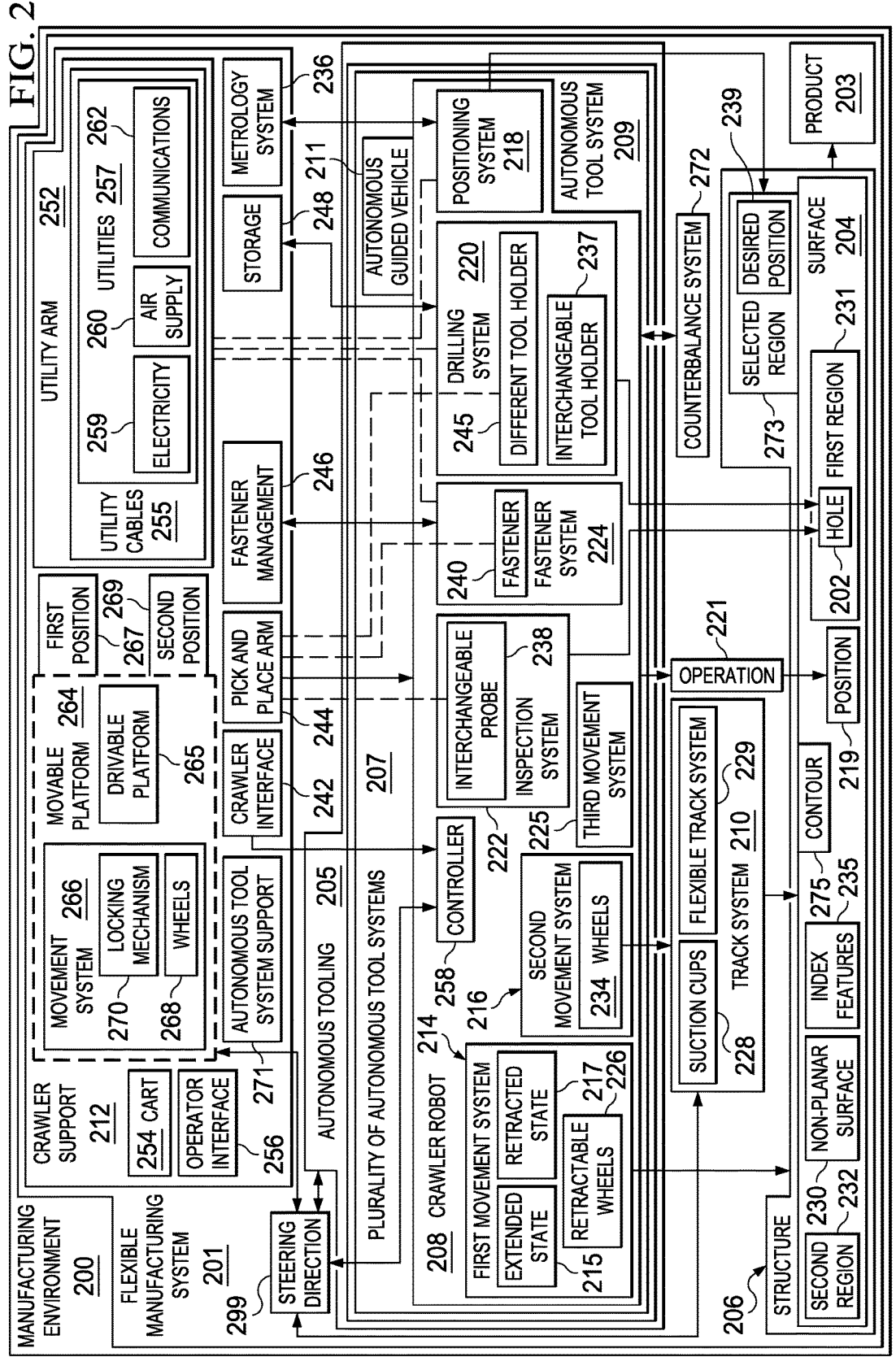
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 101 in FIG. 1 is an example of one implementation of manufacturing environment 200 in FIG. 2. Manufacturing environment 200 includes flexible manufacturing system 201. Flexible manufacturing system 201 may be used to assemble components to form product 203. Product 203 may take the form of, for example, without limitation, a wing, a fuselage, a control surface for an aerospace vehicle, a frame, a hull of a ship, or some other type of product.

Flexible manufacturing system 201 may include autonomous tooling 205, which may include plurality of autonomous tool systems 207. In this illustrative example, autonomous tool system 209 may be an example of one of plurality of autonomous tool systems 207. Autonomous tool system 209 may be any tool system configured for performing one or more operations in which the tool system may be movable. In some illustrative examples, autonomous tool system 209 may be at least partially autonomous or fully autonomous.

Autonomous tool system 209 may include a number of devices configured for performing manufacturing operations in this illustrative example. In particular, each of the number of devices may be used to perform one or more different operations. For example, an autonomous tool system in plurality of autonomous tool systems 207 may include at least one of drilling system 220, inspection system 222, fastener system 224, or some other type of device for performing manufacturing operations. This other device may take the form of, for example, without limitation, a sealing system, a cleaning system, or some other suitable type of device configured to perform manufacturing operations.

As used herein, the phrase "at least one of," when used with a list of items, means different combinations of one or more of the listed items may be used and only one of the items in the list may be needed. The item may be a particular structure, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In some illustrative examples, autonomous tool system 209 may have only a single functionality. However, in other illustrative examples, autonomous tool system 209 may have multiple functionalities. Depending on the implementation, autonomous tool system 209 may be comprised of multiple tools implemented on a single robot, system, or device.

In one illustrative example, autonomous tool system 209 may take the form of automated guided vehicle (AGV) 211. Automated guided vehicle 211 may take the form of a mobile robot that is partially autonomous or fully autonomous. As one illustrative example, autonomous tool system 209 may be automated guided vehicle 211 in the form of crawler robot 208 having multiple functionalities provided by multiple tools. In other illustrative examples, crawler robot 208 may be considered as having multiple autonomous tools as part of crawler robot 208.

Crawler robot 208 may be used to perform operations on structure 206. In some illustrative examples, structure 206 may be referred to as an object. Structure 206 may be product 203 during any one of a number of stages of manufacturing for product 203. In this manner, structure 206 may be one or more components used to form product 203, a partially completed product 203, or a fully completed product 203. In some cases, when the number of stages includes multiple stages, structure 206 may change from one stage to the next stage of the manufacturing process.

In one illustrative example, structure 206 may be one of the components used to form product 203. Structure 206 may be attached to another structure during the assembly of product 203 by fastening structure 206 to this other structure. Any number of fasteners may be used to fasten structure 206 to this other structure. As one illustrative example, fastener 240 may be used to attach structure 206 to another structure placed below structure 206. Installing fastener 240 may require that hole 202 first be formed in surface 204 of structure 206.

Crawler robot 208 may be used to drill hole 202 in surface 204 of structure 206, inspect hole 202, and install fastener 240 in hole 202. In this manner, crawler robot 208 may provide multiple functionalities.

Crawler robot 208 may use track system 210 in autonomous tooling 205 to move along surface 204 of structure 206. Track system 210 may be associated with crawler robot 208 at a side of crawler robot 208 configured to be positioned relative to surface 204 of structure 206.

As used herein, when one component is "associated" with another component, the association is a physical association in the depicted examples. For example, a first component, such as track system 210, may be considered to be associated with a second component, such as crawler robot 208, by being at least one of secured to the second component, bonded to the second component, mounted to the second component, welded to the second component, fastened to the second component, coupled to the second component, or connected to the second component in some other suitable manner. The first component also may be connected to the second component using a third component. Further, the first component may be considered to be associated with the second component by being formed as part of the second component, an extension of the second component, or both.

Track system 210 may be separate from crawler robot 208 in this illustrative example. However, in other illustrative examples, track system 210 may be considered part of crawler robot 208.

As depicted, crawler robot 208 may have first movement system 214, second movement system 216, and positioning system 218. Further, crawler robot 208 may have a set of tools that includes drilling system 220, inspection system 222, and fastener system 224.

Crawler robot 208 may be moved using at least one of first movement system 214 or second movement system 216. For example, crawler robot 208 may be positioned on and moved on surface 204 from one location on surface 204 to another location on surface 204 using one of first movement system 214 or second movement system 216.

As used herein, "positioning" an item, such as positioning crawler robot 208, may include moving the item such that the item has a particular location, a particular orientation, or both. In this manner, a position may include at least one of a location or an orientation. A location may be a location with respect to a coordinate system. The coordinate system may be a two-dimensional coordinate system or a three-dimensional coordinate system, depending on the implementation.

First movement system 214 may be configured to move crawler robot 208 and track system 210 together along surface 204. First movement system 214 may move between extended state 215 and retracted state 217. When first movement system 214 is in extended state 215, track system 210 may not extend below first movement system 214. When first movement system 214 is in extended state 215, track system 210 may be lifted and may be unable to contact surface 204. When first movement system 214 is in retracted state 217, track system 210 may extend to a same level as first movement system 214 or below first movement system 214. When first movement system 214 is in retracted state 217, track system 210 may not be lifted and may be able to contact surface 204.

In this illustrative example, first movement system 214 may have retractable wheels 226. When crawler robot 208 and track system 210 are located over surface 204, retractable wheels 226 may move between being fully extended and fully retracted to move first movement system 214 between extended state 215 and retracted state 217, respectively. In this manner, first movement system 214 may be extended by extending retractable wheels 226 and retracted by retracting retractable wheels 226.

When retractable wheels 226 are fully extended, first movement system 214 may be in extended state 215 and retractable wheels 226 may contact surface 204 but track system 210 may not contact surface 204. However, when retractable wheels 226 are fully retracted, first movement system 214 may be in retracted state 217 and track system 210 may contact surface 204 but retractable wheels 226 may not contact surface 204.

In one illustrative example, crawler robot 208 and track system 210 may be positioned within first region 231 of surface 204 of structure 206 with retractable wheels 226 fully retracted such that track system 210 is in contact with surface 204. Retractable wheels 226 may be extended to lift track system 210 away from surface 204. With track system 210 lifted from surface 204, first movement system 214 may move crawler robot 208 and track system 210 along surface 204 away from first region 231 without causing any undesired effects on surface 204.

For example, crawler robot 208 and track system 210 may be moved or driven from first region 231 to second region 232. In other illustrative examples, first movement system 214 may move crawler robot 208 and track system 210 may be moved or driven from second region 232 back to first region 231 or some other region. In this manner, first movement system 214 may move crawler robot 208 and track system 210 from one region to another region on surface 204. In other words, first movement system 214 may move crawler robot 208 and track system 210 from one rough location to another rough location.

After moving crawler robot 208 and track system 210 to second region 232, retractable wheels 226 may be retracted such that track system 210 is moved towards surface 204 and placed on surface 204. Once track system 210 is placed onto surface 204, track system 210 may be coupled to surface 204.

Coupling track system 210 to surface 204 may include adhering, connecting, attaching, or securing in some other manner, track system 210 to surface 204. In one illustrative example, track system 210 may be coupled to surface 204 using suction cups 228. Suction cups 228 may hold track system 210 in a substantially fixed position within second region 232 on surface 204. Retractable wheels 226 may be retracted far enough to apply sufficient force to cause suction cups 228 to be secured to surface 204. However, sufficient force in the opposite direction may detach suction cups 228 from surface 204 to uncouple track system 210 from surface 204. In this manner, track system 210 may be removably coupled to surface 204.

In some illustrative examples, track system 210 may take the form of flexible track system 229. Flexible track system 229 allows track system 210 to substantially conform to surface 204 when surface 204 takes the form of non-planar surface 230. Flexible track system 229 may move or flex such that flexible track system 229 may conform to contour 275 of surface 204, even when surface 204 is non-planar surface 230. Flexible track system 229 may also be referred to as a flex track or flex track system in some cases.

Depending on the implementation, crawler robot 208 and track system 210 may be moved to several locations on structure 206 using first movement system 214. Crawler robot 208 may be used to perform different types of operations at these different locations on structure 206. First movement system 214 may allow crawler robot 208 to perform functions across substantially an entirety of surface 204 of structure 206.

Second movement system 216 may be configured to move crawler robot 208 relative to track system 210 on surface 204. Second movement system 216 may include wheels 234. As one illustrative example, when crawler robot 208 and track system 210 are positioned within first region 231, crawler robot 208 may move along track system 210 to be positioned over locations within first region 231 of surface 204. Crawler robot 208 may perform one or more operations at each of these locations within first region 231 of surface 204 after crawler robot 208 is positioned over each location.

In some illustrative examples, first movement system 214 may be used to roughly position crawler robot 208 relative to surface 204. In particular, first movement system 214 may allow crawler robot 208 to be roughly positioned within some region or at some location on surface 204. In these examples, second movement system 216 may be considered as providing a finer level of positioning for crawler robot 208 relative to surface 204 compared to first movement system 214. In other words, first movement system 214 may allow rough movement and positioning relative to surface 204, while second movement system 216 may allow more precise movement and positioning of crawler robot 208 relative to surface 204.

When crawler robot 208 is moved to a particular position on surface 204 using at least one of first movement system 214 or second movement system 216, the position of crawler robot 208 may be identified using positioning system 218 of crawler robot 208. The identification of the position may be used to, for example, verify the position.

For example, after being moved to a position on surface 204 by first movement system 214, crawler robot 208 may use positioning system 218 to determine if crawler robot 208 is within selected tolerances of desired position 239 on surface 204 before retracting retractable wheels 226 and placing track system 210 onto surface 204. If crawler robot 208 is in desired position 239 on surface 204, retractable wheels 226 may then be retracted. If crawler robot 208 is not in desired position 239 on surface 204, crawler robot 208 and track system 210 may be moved to a new position using first movement system 214 and positioning system 218 may then be used to verify that the new position is within selected tolerances of desired position 239.

In some illustrative examples, position 219 on surface 204 of crawler robot 208 may be verified using positioning system 218 before an operation is performed at position 219. For example, when crawler robot 208 is moved along track system 210 to position 219 on surface 204 to perform a particular operation 221, positioning system 218 may be used to verify that position 219 of crawler robot 208 is within selected tolerances of some selected or desired position 239 for performing that particular operation 221. If crawler robot 208 is within selected tolerances of desired position 239, crawler robot 208 may then begin performing the operation. Otherwise, crawler robot 208 may need to be moved along track system 210 to adjust the position of crawler robot 208 relative to surface 204.

In one illustrative example, positioning system 218 may be configured to identify desired position 239 of crawler robot 208 on surface 204 based on index features 235 of surface 204. Index features 235 may include, for example, without limitation, surface features, surface protrusions, labels, marks, painted features, illuminated features, laser dots, or some combination thereof.

In other illustrative examples, positioning system 218 may communicate with metrology system 236 of crawler support 212 to identify a position of crawler robot 208. In some illustrative examples, metrology system 236 may be part of positioning system 218 and used to verify the position of crawler robot 208. Metrology system 236 may comprise at least one of an indoor global positioning system (iGPS), an optical positioning system, a radio frequency positioning system, an acoustic positioning system, a laser tracker, a vision system, a motion capture system, a laser radar system, or a photogrammetry system, depending on the implementation.

Once crawler robot 208 and track system 210 are positioned in desired position 239 relative to surface 204, crawler robot 208 may perform functions, or operations, on surface 204. Crawler robot 208 may use, for example, without limitation, drilling system 220, inspection system 222, and fastener system 224 to perform operations.

In one illustrative example, crawler robot 208 and track system 210 may use drilling system 220 to drill hole 202 at a position within first region 231 of surface 204. Depending on the implementation, hole 202 may take the form of a cylindrical hole, a conical hole, a countersink hole, a counterbore hole, or some other type of hole 202.

Drilling system 220 may include interchangeable tool holder 237. Interchangeable tool holder 237 may be removed to place a different tool holder into drilling system 220. Different tool holders may be placed in drilling system 220 such that different drilling tools may be used. In this manner, a diameter of hole 202 may be changed if needed. For example, interchangeable tool holder 237 may be replaced with a drill tool holder configured to hold a drilling tool of a smaller diameter such that hole 202 has a smaller diameter. In another example, interchangeable tool holder 237 may be replaced with a tool holder of a larger diameter such that hole 202 has a larger diameter.

Drilling holes in structure 206 and/or other structures or parts used to form product 203 may be considered a critical path process. For example, without limitation, factors, such as the placement, size, and orientation of these holes, as well as other factors, may be important in ensuring that the different structures are secured together within selected tolerances. Consequently, the holes drilled may need to be inspected.

After drilling hole 202, crawler robot 208 may inspect hole 202. Crawler robot 208 may use inspection system 222 to inspect hole 202. In one illustrative example, inspection system 222 may inspect the diameter of hole 202. Inspection system 222 may inspect the diameter of hole 202 using, for example, without limitation, interchangeable probe 238. In some illustrative examples, interchangeable probe 238 may be inserted into hole 202 to determine if hole 202 has a desired diameter.

Depending on the type of hole 202 formed, inspection system 222 may be used to inspect other parameters for hole 202. For example, without limitation, inspection system 222 may be used to inspect at least one of a diameter, a countersink depth, a countersink diameter, a grip length, or some other parameter for hole 202.

Interchangeable probe 238 may be removed to place a different probe into inspection system 222. Different probes may be placed in inspection system 222 to inspect holes of different diameters. In some illustrative examples, interchangeable probe 238 may be replaced with a thinner probe to inspect hole 202 having a smaller diameter. In some illustrative examples, interchangeable probe 238 may be replaced with a thicker probe to inspect hole 202 having a larger diameter.

After inspecting hole 202, crawler robot 208 may use fastener system 224 to install fastener 240 in hole 202. Fastener 240 may be used to join structure 206 to another structure or part positioned below structure 206. For example, structure 206 may be skin panel 124 in FIG. 1 and fastener 240 may be used to join structure 206 to the underlying structure of wing 104 in FIG. 1.

Fastener 240 may be placed in hole 202 using fastener system 224. In some illustrative examples, fastener system 224 may accommodate several diameters of fasteners.

In this illustrative example, crawler robot 208 may have third movement system 225. Third movement system 225 may be referred to as a device movement system or a tool movement system in some illustrative examples. Third movement system 225 may be used to move and thereby, precisely position, the one or more devices included in crawler robot 208. For example, without limitation, third movement system 225 may be used to move and precisely position each of drilling system 220, inspection system 222, and fastener system 224 relative to position 219 at which operation 221 is to be performed.

In one illustrative example, third movement system 225 may be used to move and precisely position interchangeable tool holder 237, and in some cases, the drill tool or drill bit being held by interchangeable tool holder 237, relative to position 219 for performing drilling. Further, third movement system 225 may be used to move and precisely position interchangeable probe 238 relative to position 219 for performing inspection. Still further, third movement system 225 may be used to move and precisely position fastener 240 relative to position 219 for performing fastener insertion.

Crawler support 212 may be a system of various components configured to support crawler robot 208. Crawler support 212 may include at least one of movable platform 264, metrology system 236, crawler interface 242, pick and place arm 244, fastener management system 246, storage 248, utility arm 252, cart 254, or operator interface 256. Crawler interface 242 may be configured to interact with at least one of controller 258 of crawler robot 208, metrology system 236, pick and place arm 244, fastener management system 246, utility arm 252, cart 254, or operator interface 256, depending on the implementation.

Pick and place arm 244 may be present on crawler support 212. Pick and place arm 244 may be associated with movable platform 264. Pick and place arm 244 may be configured to place crawler robot 208 and track system 210 onto surface 204 of structure 206. In particular, pick and place arm 244 may place crawler robot 208 within selected region 273 on surface 204. In one illustrative example, desired position 239 for crawler robot 208 may be a position selected within selected region 273. For example, pick and place arm 244 may be configured to pick crawler robot 208 and track system 210 up off of a floor of manufacturing environment 200, a platform in manufacturing environment 200, or some other surface in manufacturing environment 200 and place crawler robot 208 and track system 210 on surface 204. Similarly, pick and place arm 244 may be configured to lift crawler robot 208 and track system 210 off of surface 204 of structure 206.

Pick and place arm 244 may only lift crawler robot 208 and track system 210 from surface 204 after all desired functions have been performed by crawler robot 208 on surface 204. In some illustrative examples, pick and place arm 244 may lift crawler robot 208 and track system 210 from surface 204 to reposition crawler robot 208 and track system 210 some distance away on surface 204 that may not be easily reachable using only first movement system 214. In other illustrative examples, pick and place arm 244 may lift crawler robot 208 and track system 210 from surface 204 to reposition crawler robot 208 and track system 210 on surface 204 when repositioning using pick and place arm 244 would take less time than moving crawler robot 208 and track system 210 using first movement system 214.

Additionally, pick and place arm 244 may be used to supply parts to crawler robot 208 while crawler robot 208 is on surface 204. In some illustrative examples, pick and place arm 244 may be used to replace interchangeable tool holder 237 of drilling system 220, interchangeable probe 238 of inspection system 222, or both.

For example, pick and place arm 244 may remove interchangeable tool holder 237 from drilling system 220 of crawler robot 208 while crawler robot 208 is on surface 204. Pick and place arm 244 may place interchangeable tool holder 237 in storage 248 of crawler support 212. Pick and place arm 244 may select different tool holder 245 from storage 248. Pick and place arm 244 may position this different tool holder 245 in drilling system 220 of crawler robot 208 on surface 204 of structure 206.

As another illustrative example, pick and place arm 244 may remove interchangeable probe 238 from inspection system 222 of crawler robot 208 while crawler robot 208 is on surface 204. Pick and place arm 244 may place interchangeable probe 238 in storage 248 of crawler support 212 and then select a different probe from storage 248. Pick and place arm 244 may position this different probe in inspection system 222 of crawler robot 208 on surface 204 of structure 206.

In some illustrative examples, pick and place arm 244 may provide fastener 240 to fastener system 224 of crawler robot 208 on surface 204 of structure 206. Pick and place arm 244 may retrieve fastener 240 from, for example, without limitation, fastener management system 246, prior to providing fastener 240 to fastener system 224.

Fastener management system 246 may store fasteners and other parts for fastener system 224. Fastener management system 246 may include storage of several different diameters and grip lengths of fasteners. Fastener management system 246 may also perform other functions. For example, fastener management system 246 may perform at least one of washing fasteners to remove any undesired residue, applying sealant to fasteners, or other desirable actions.

Crawler support 212 may have utility arm 252. Utility arm 252 may move utility cables 255 attached to crawler robot 208 as crawler robot 208 moves along surface 204. Utility cables 255 may supply utilities 257 to crawler robot 208. Specifically, utility cables 255 may supply utilities 257 to at least one of inspection system 222, fastener system 224, drilling system 220, or positioning system 218. Utilities 257 may include at least one of electricity 259, air supply 260, communications 262, or other desirable utilities.

In some illustrative examples, crawler support 212 may include movable platform 264. Movable platform 264 may include movement system 266. Movement system 266 may include wheels 268 and locking mechanism 270. Wheels 268 may be used to position movable platform 264 relative to structure 206. Locking mechanism 270 may be used to hold movable platform 264 in a position relative to structure 206 while crawler robot 208 performs functions on surface 204 of structure 206.

Movement system 266 of movable platform 264 may allow movable platform 264 to be driven from first position 267 to second position 269. In this manner, movable platform 264 may be referred to as drivable platform 265.

Movable platform 264 may provide support to crawler robot 208 irrespective of size or shape of structure 206. In other words, movable platform 264 may provide more flexibility in manufacturing environment 200 than platforms that are permanently tied or bolted to manufacturing environment 200.

In this illustrative example, steering direction 299 may be provided for components within flexible manufacturing system 201. As an example, steering direction 299 may be provided for crawler robot 208, movable platform 264, and other mobile devices in flexible manufacturing system 201. Steering direction 299 may be provided as these devices move through manufacturing environment 200.

Steering direction 299 may take the form of commands, instructions, path generation, physically changing the direction of movement, and other methods of guidance. In this illustrative example, steering direction 299 may dynamically change as conditions within manufacturing environment 200 change.

Steering direction 299 may be provided by at least one of an on-board controller, a system controller, a human operator, or some other suitable device. As an example, a system controller may send commands to steer crawler robot 208. In yet another example, one or more of human operators may steer movable platform 264 by physically changing its direction. In other illustrative examples, crawler robot 208, movable platform 264, or both may steer itself, not under the direction of a controller.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although first movement system 214, second movement system 216, and movement system 266 are described as having retractable wheels 226, wheels 234, and wheels 268, respectively, these movement systems may be implemented using any number or type of movement devices. For example, without limitation, each of these movement systems may be implemented using at least one of rollers, gliders, air bearings, a holonomic system, a track system, sliders, holonomic wheels, mecanum wheels, omni wheels, poly wheels, rails, or some other type of movement device.

In one illustrative example, movement system 266 may include an air system in addition to or in place of wheels 268. The air system may include, for example, without limitation, air bearings that may be used to form air cushions that can be used to move movable platform 264. In some illustrative examples, locking mechanism 270 may not be needed. Rather, gravity may be used to hold movable platform 264 in place. In other illustrative examples, an indoor global positioning system (iGPS) or some other type of system may be used to position crawler robot 208 on surface 204 instead of positioning system 218 of crawler robot 208.

In some illustrative examples, autonomous tooling 205 may include counterbalance system 272, which may also be referred to as a counterweight system. Counterbalance system 272 may be associated with at least one of a ceiling of manufacturing environment 200, crawler support 212, utility arm 252, movable platform 264, or pick and place arm 244, depending on the implementation. Counterbalance system 272 may be used to balance the weight of crawler robot 208 to reduce undesired loads placed on structure 206 by crawler robot 208. Counterbalance system 272 may use, for example, without limitation, a weighted item less than or substantially equal in weight to crawler robot 208.

Counterbalance system 272 may take the form of a cable with one end attached to crawler robot 208 and the other end run over a pulley attached to some upper structure, such as a ceiling of manufacturing environment or pick and place arm 244. In another illustrative example, counterbalance system 272 may take the form of an arm associated with crawler support 212 having a weighted item less than or substantially equal in weight to crawler robot 208 attached.

Of course, in other illustrative examples, counterbalance system 272 may be implemented in some other manner that allows the weight of crawler robot 208 to be balanced to reduce undesired loads placed on structure 206 by crawler robot 208. In this manner, counterbalance system 272 may take a number of different forms. For example, without limitation, counterbalance system 272 may include any number of cables, tethers, pulley devices, bearings, wheels, hooks, weights, or other types of elements or devices.

In other illustrative examples, crawler support 212 may be used to support autonomous tool system 209 having some other form than crawler robot 208. In these examples, crawler support 212 may be referred to as autonomous tool system support 271.

Figure 3:
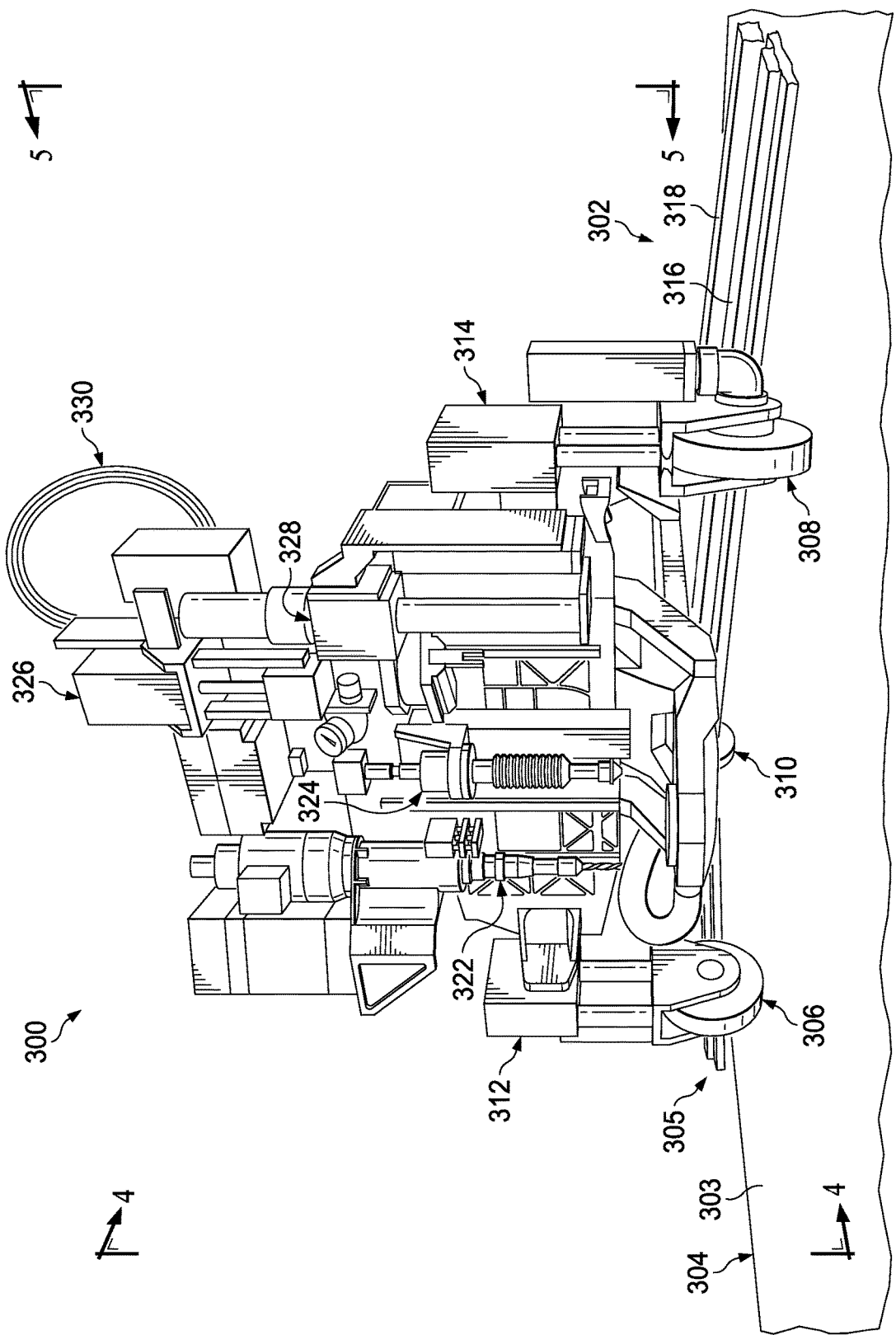
FIG. 3 is an illustration of an isometric view of a crawler robot with wheels extended and a track in accordance with an illustrative embodiment.

Turning now to FIG. 3, an illustration of an isometric view of a crawler robot with wheels extended and a track is depicted in accordance with an illustrative embodiment. Crawler robot 300 may be a physical implementation of crawler robot 208 shown in block form in FIG. 2. Crawler robot 300 may be an example of a crawler robot working on an aircraft such as crawler robot 122 on aircraft 100 of FIG. 1.

Crawler robot 300 may be associated with track system 302. Crawler robot 300 may be positioned on surface 303 of structure 304. Crawler robot 300 may include first movement system 305 configured to move crawler robot 300 and track system 302 along surface 303 of structure 304. First movement system 305 may be an example of one implementation for first movement system 214 in FIG. 2.

First movement system 305 may include wheel 306, wheel 308, wheel 310, and a fourth wheel not visible in this view. Each of these wheels may be retractable in this illustrative example. In this manner, wheel 306, wheel 308, wheel 310, and the fourth wheel (not shown) may be an example of one implementation for retractable wheels 226 in FIG. 2. For example, first movement system 305 may include extension system 312 and extension system 314 to extend and retract wheel 306 and wheel 308. First movement system 305 may also include two more extension systems (not shown in this view) for extending and retracting wheel 310 and the fourth wheel (not shown in this view).

As depicted, to move crawler robot 300 and track system 302 along surface 303 of structure 304, extension system 312 and extension system 314 may extend wheel 306 and wheel 308. When wheel 306 and wheel 308 are extended, crawler robot 300 may lift track system 302 off surface 303 of structure 304. With track system 302 lifted, wheel 306 and wheel 308 may be used to move crawler robot 300 and track system 302 along surface 303 of structure 304. In this manner, crawler robot 300 and track system 302 may move along surface 303 of structure 304 without track system 302 causing any undesired effects on surface 303.

Track system 302 may include track 316 and track 318. As illustrated, track 316 and track 318 may be elevated above surface 303 of structure 304 when wheel 306 and wheel 308 are fully extended.

Crawler robot 300 may also include drilling system 322, inspection system 324, positioning system 326, and fastener system 328. Drilling system 322, inspection system 324, positioning system 326, and fastener system 328 may be examples of physical implementations for drilling system 220, inspection system 222, positioning system 218, and fastener system 224, respectively, in FIG. 2.

Crawler robot 300 may use drilling system 322 to drill a hole in surface 303 of structure 304. In some illustrative examples, drilling system 322 may include an interchangeable tool holder, such as interchangeable tool holder 237 described in FIG. 2. Crawler robot 300 may use inspection system 324 to inspect a hole drilled using drilling system 322.

Utilities 330 may be provided to at least one of drilling system 322, inspection system 324, positioning system 326, and fastener system 328. Utilities 330 may provide at least one of electricity, air supply, communications, or other desirable utilities. Utilities 330 may be an example of one implementation for utilities 257 in FIG. 2.

Figure 4:
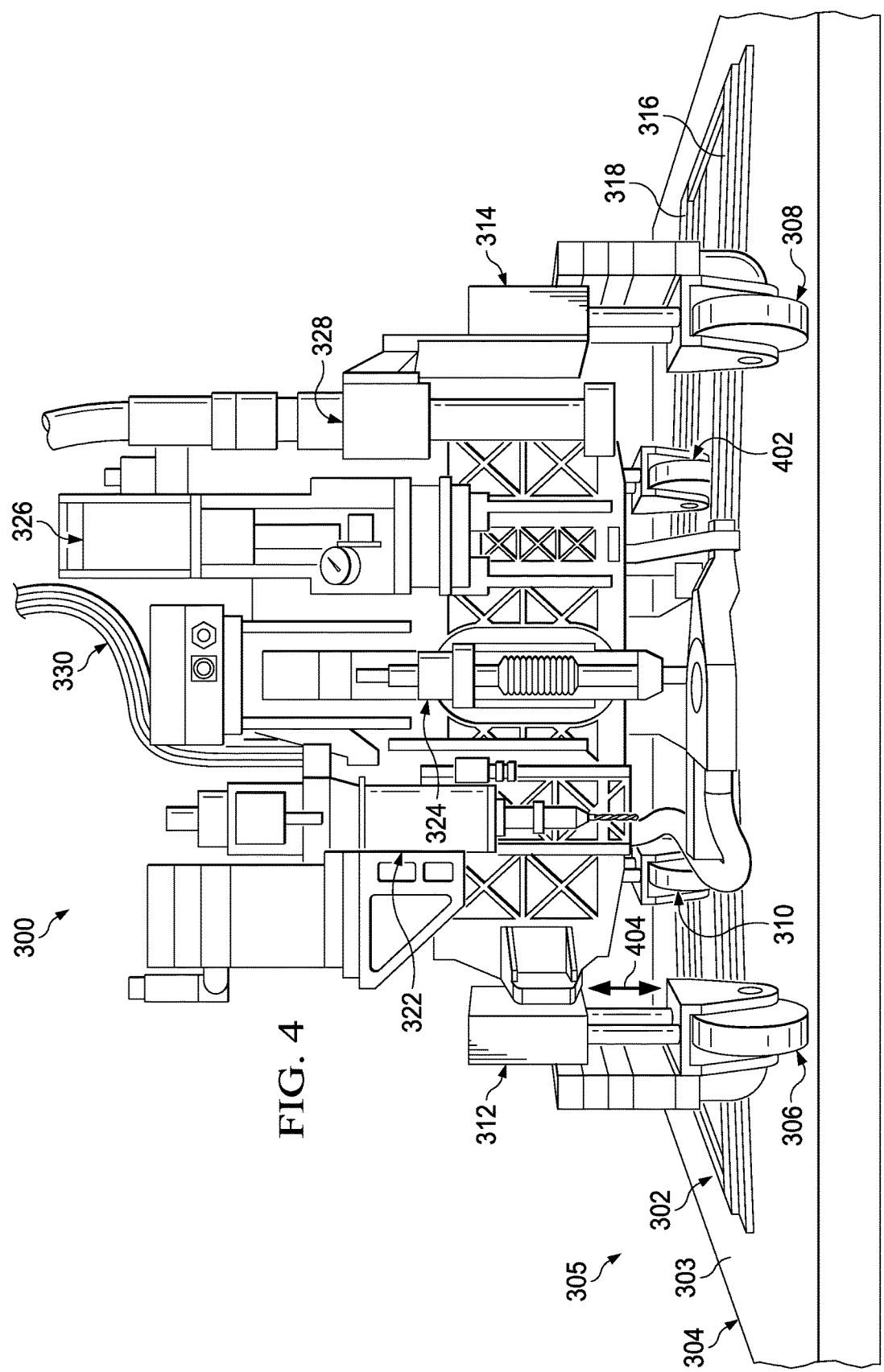
FIG. 4 is an illustration of a front view of a crawler robot with wheels extended and a track system in accordance with an illustrative embodiment.

Turning now to FIG. 4, an illustration of a front view of a crawler robot with wheels extended and a track system is depicted in accordance with an illustrative embodiment. Specifically, FIG. 4 may be a view of crawler robot 300 from view 4-4 of FIG. 3. In this view, wheel 402 of first movement system 305 is visible. As depicted, first movement system 305 is extended. In the illustrative examples in which first movement system 305 is retracted, extension system 312 and extension system 314 of crawler robot 300 may move in direction 404 relative to surface 303.

Figure 5:
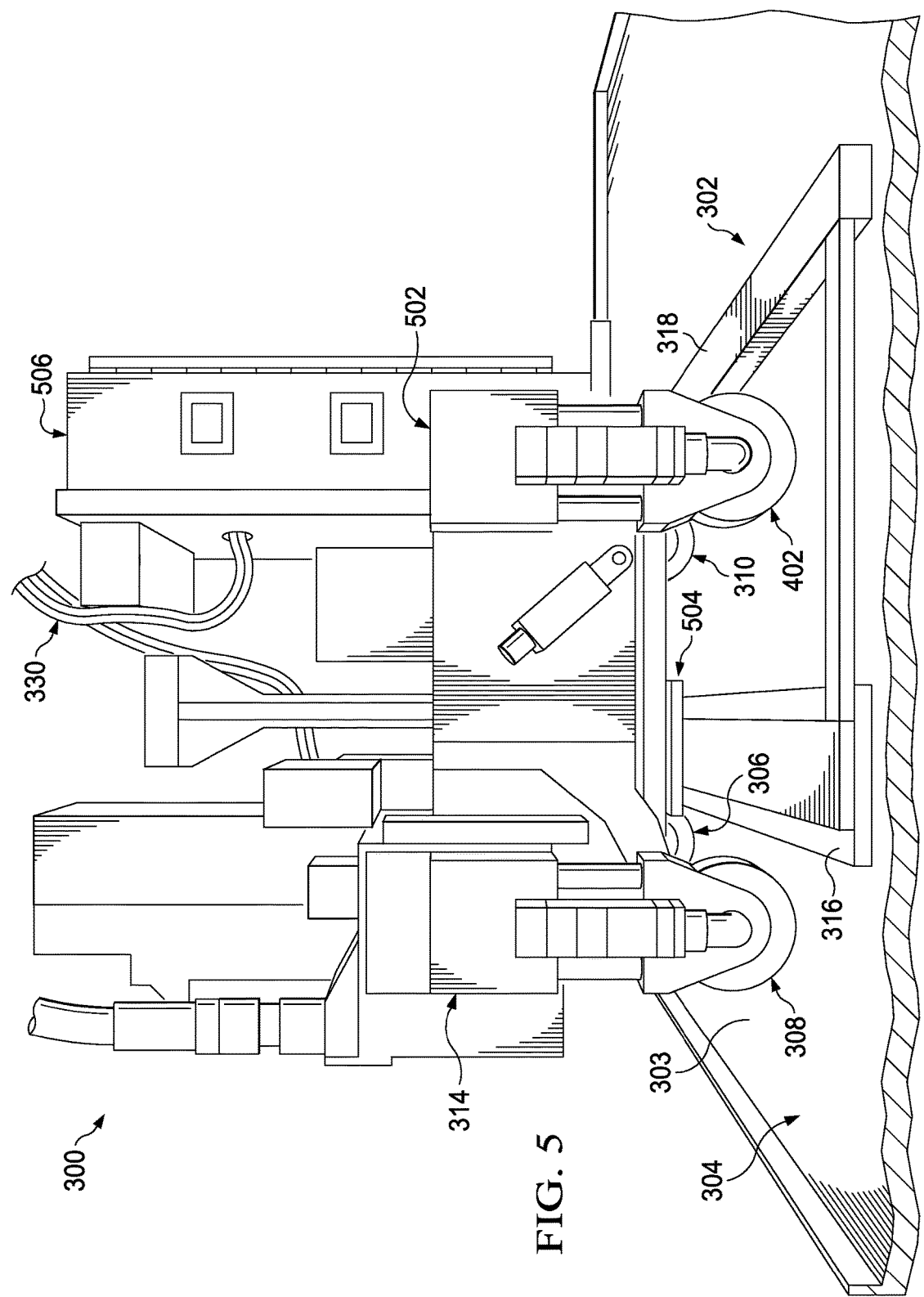
FIG. 5 is an illustration of a side view of a crawler robot with wheels extended and a track system in accordance with an illustrative embodiment.

Turning now to FIG. 5, an illustration of a side view of a crawler robot with wheels extended and a track system is depicted in accordance with an illustrative embodiment. Specifically, FIG. 5 may be a view of crawler robot 300 from view 5-5 of FIG. 3.

In this view, extension system 502 associated with wheel 402 is visible. Extension system 502 may be configured to extend or retract wheel 402. In this view, second movement system 504 is also visible. Second movement system 504 may be an example of one implementation for second movement system 216 in FIG. 2. Second movement system 504 may be configured to move crawler robot 300 along track system 302 on surface 303 when first movement system 305 is retracted.

In this manner, first movement system 305 may allow crawler robot 300 and track system 302 to be roughly positioned within a region in which operations are to be performed. Second movement system 504 may allow precise movement of crawler robot 300 along track system 302 such that crawler robot 300 may be precisely positioned in a desired position relative to surface 303.

Figure 6:
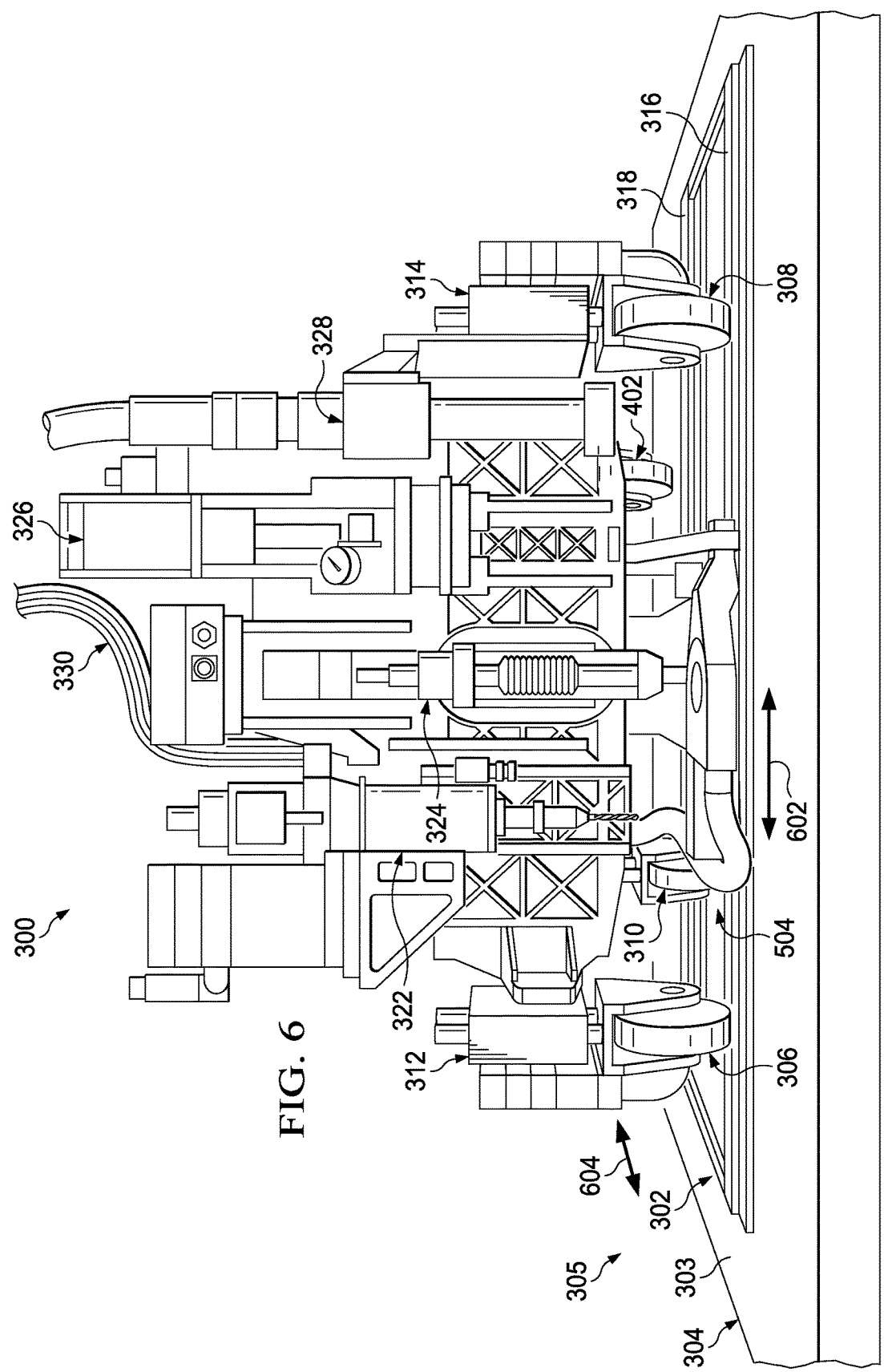
FIG. 6 is an illustration of a front view of a crawler robot with wheels retracted and a track system in accordance with an illustrative embodiment.

Turning now to FIG. 6, an illustration of a front view of a crawler robot with wheels retracted and a track system is depicted in accordance with an illustrative embodiment. Specifically, FIG. 6 may be another view of crawler robot 300 from view 4-4 of FIG. 3 with wheel 306, wheel 308, wheel 310, and wheel 402 retracted. In other words, first movement system 305 is retracted in FIG. 6. When wheel 306, wheel 308, wheel 310, and wheel 402 are retracted, wheel 306, wheel 308, wheel 310, and wheel 402 do not contact surface 303 of structure 304.

As depicted, track system 302 is positioned on surface 303 of structure 304. The retraction of first movement system 305 may place track system 302 on surface 303 of structure 304.

When track system 302 is positioned on surface 303 of structure 304, second movement system 504 may move crawler robot 300 along track system 302. Crawler robot 300 may move along track system 302 in at least one of direction 602 and direction 604. Crawler robot 300 may move along track system 302 to position at least one of drilling system 322, inspection system 324, positioning system 326, or fastener system 328 to perform a function on surface 303 of structure 304.

Figure 7:
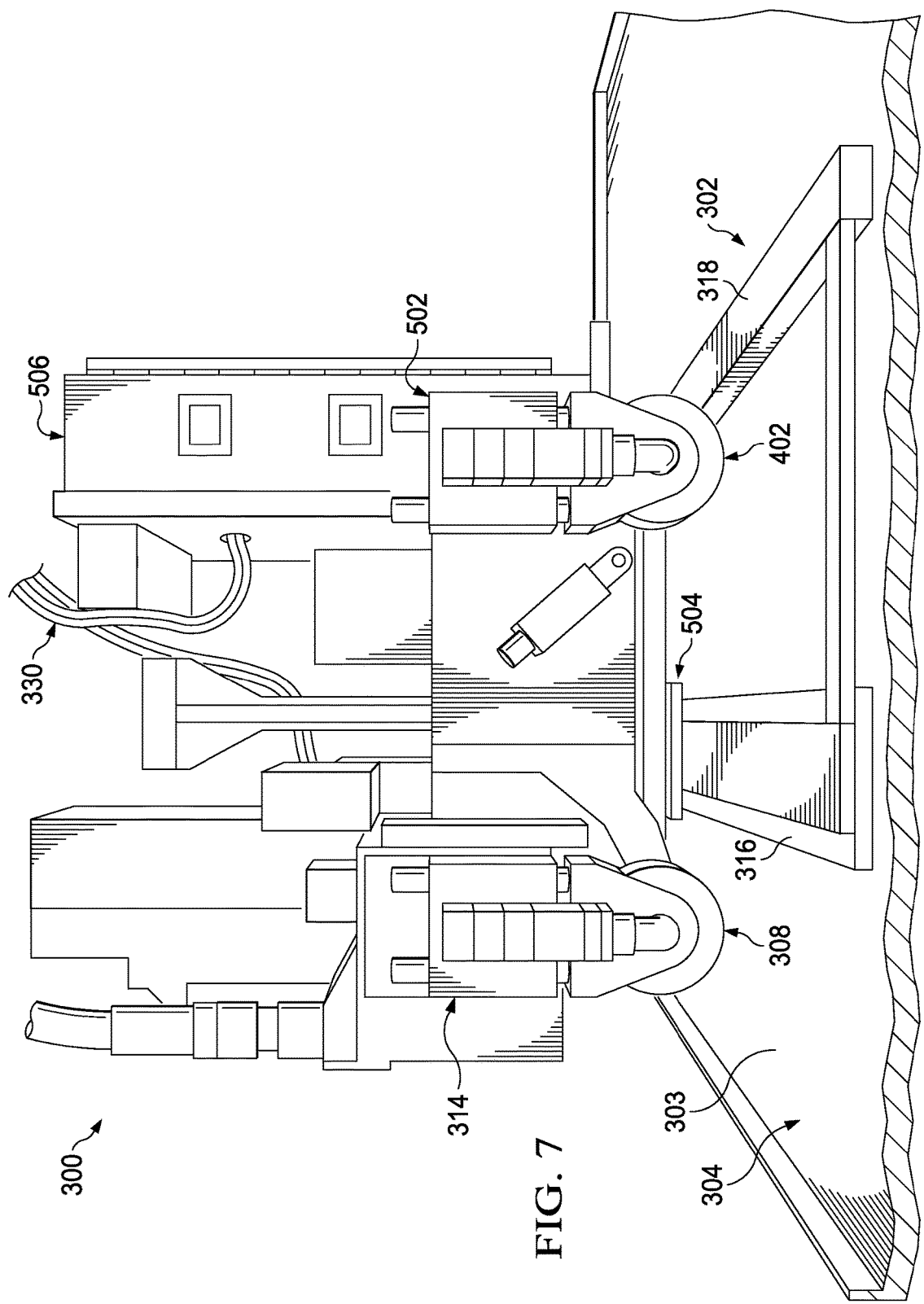
FIG. 7 is an illustration of a side view of a crawler robot with wheels retracted and a track system in accordance with an illustrative embodiment.

Turning now to FIG. 7, an illustration of a side view of a crawler robot with wheels retracted and a track system is depicted in accordance with an illustrative embodiment. Specifically, FIG. 7 may be another view of crawler robot 300 from view 5-5 of FIG. 3 with wheel 306, wheel 308, wheel 310, and wheel 402 retracted.

Figure 8:
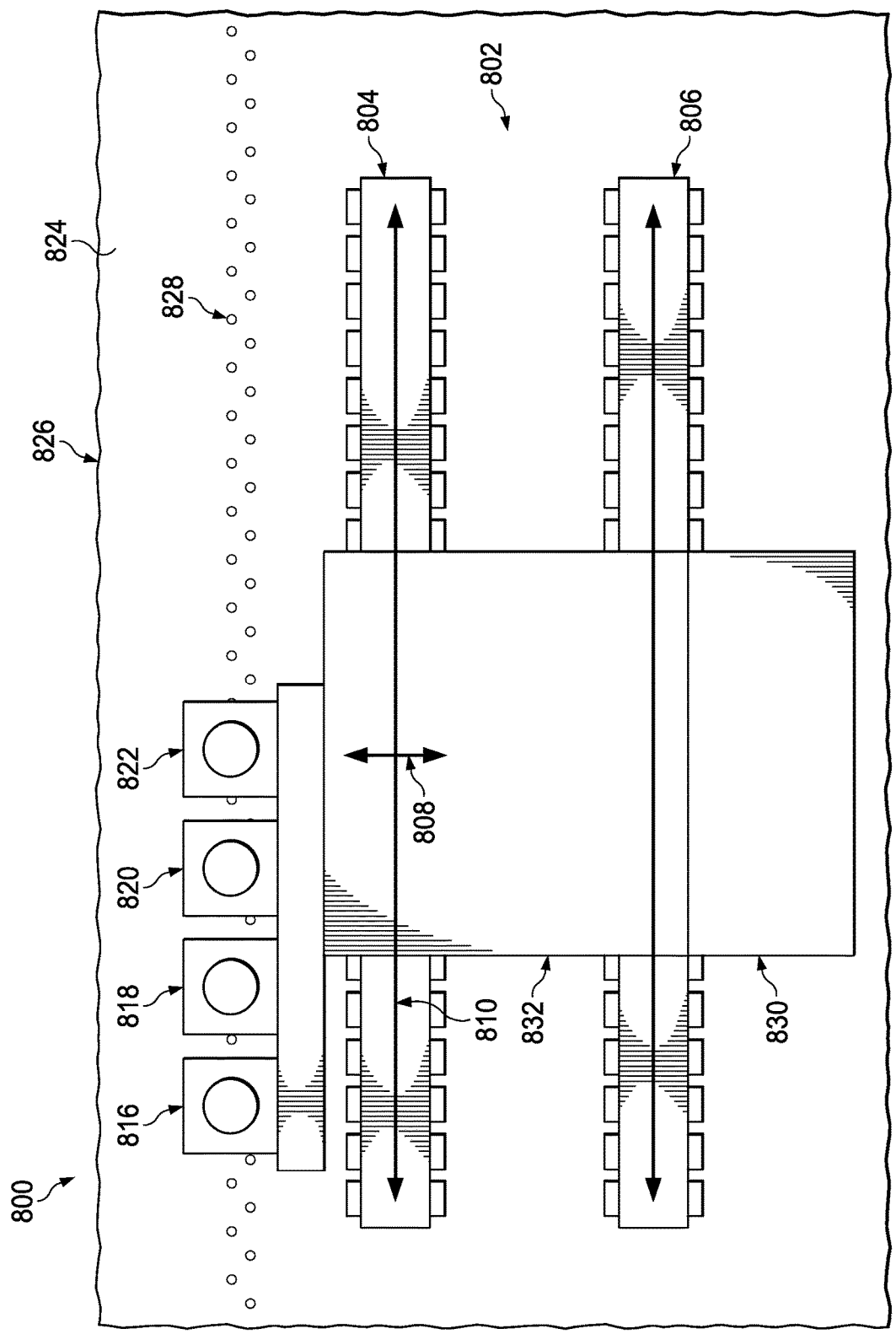
FIG. 8 is an illustration of a top view of a crawler robot and a track system in accordance with an illustrative embodiment.

Turning now to FIG. 8, an illustration of a top view of a crawler robot and a track system is depicted in accordance with an illustrative embodiment. Crawler robot 800 may be a physical implementation of crawler robot 208 shown in block form in FIG. 2. Crawler robot 800 may be an example of a crawler robot working on an aircraft such as crawler robot 122 on aircraft 100 of FIG. 1.

Crawler robot 800 may be associated with track system 802. As depicted, track system 802 may include track 804 and track 806. Crawler robot 800 may move along track system 802 in at least one of direction 808 and direction 810. By moving crawler robot 800 along at least one of direction 808 and direction 810, at least one of fastener system 816, positioning system 818, inspection system 820, and drilling system 822 may be precisely positioned relative to surface 824 of structure 826 in a desired position within selected tolerances.

At least one of fastener system 816, positioning system 818, inspection system 820, and drilling system 822 may be positioned such that a function may be performed at the desired position on surface 824 of structure 826. In one illustrative example, drilling system 822 may form plurality of holes 828. Electronics 830 and body 832 of crawler robot 800 may support at least one of fastener system 816, positioning system 818, inspection system 820, and drilling system 822 of crawler robot 800.

Figure 9:
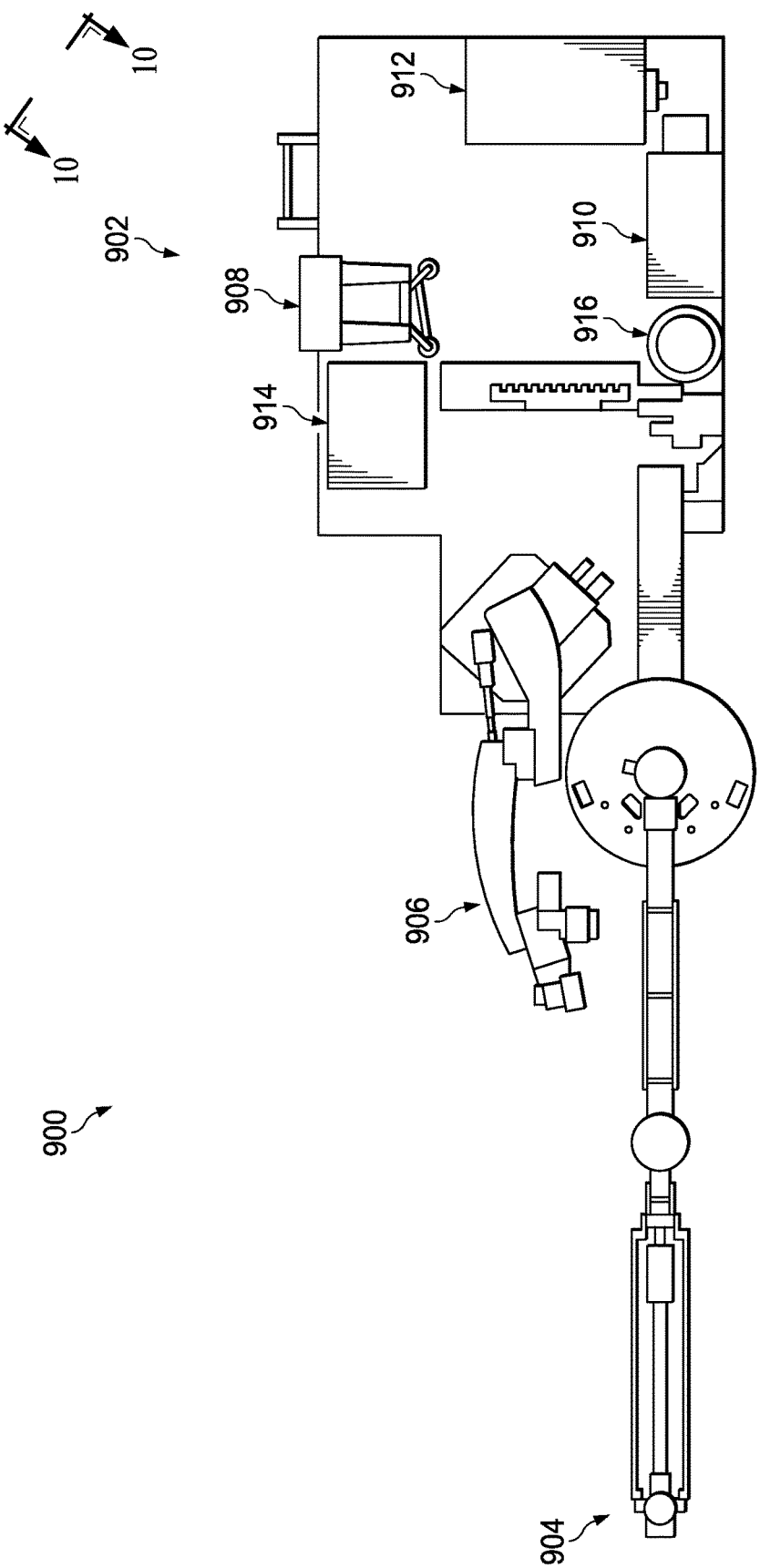
FIG. 9 is an illustration of a top view of a platform in accordance with an illustrative embodiment.

Turning now to FIG. 9, an illustration of a top view of a platform is depicted in accordance with an illustrative embodiment. Platform 900 may be a physical implementation of crawler support 212 shown in block form in FIG. 2. Specifically, platform 900 may be a physical implementation of movable platform 264 shown in block form in FIG. 2. Platform 900 may be an example of a movable platform for supporting a crawler robot working on an aircraft, such as platform 120 of FIG. 1.

Platform 900 may include cart 902, utility arm 904, pick and place arm 906, operator interface 908, crawler controller 910, fastener management system 912, robot controller 914, and chip and dust collection system 916. Cart 902 may be a base for platform 900. Cart 902 may support the remaining portions of platform 900.

Utility arm 904 may move utility cables, air supply, chip & and dust collection tubing, and a fastener transportation tube attached to a crawler robot as the crawler robot moves along a surface of a structure. Pick and place arm 906 may place a crawler robot onto a surface of a structure. Pick and place arm 906 may move fasteners from fastener management system 912 to the crawler robot. Pick and place arm 906 may move components to and from storage. For example, pick and place arm 906 may be used to replace one tool holder with another tool holder located in storage.

Operator interface 908 may provide for an operator to interact with one of platform 900 and the crawler robot. The metrology system is a separate system not attached to this platform. Targets for the metrology system are attached to this platform, but nothing on this platform communicates directly with them. In some illustrative examples, the metrology system may interact with the crawler robot to determine the location of the crawler robot.

Figure 10:
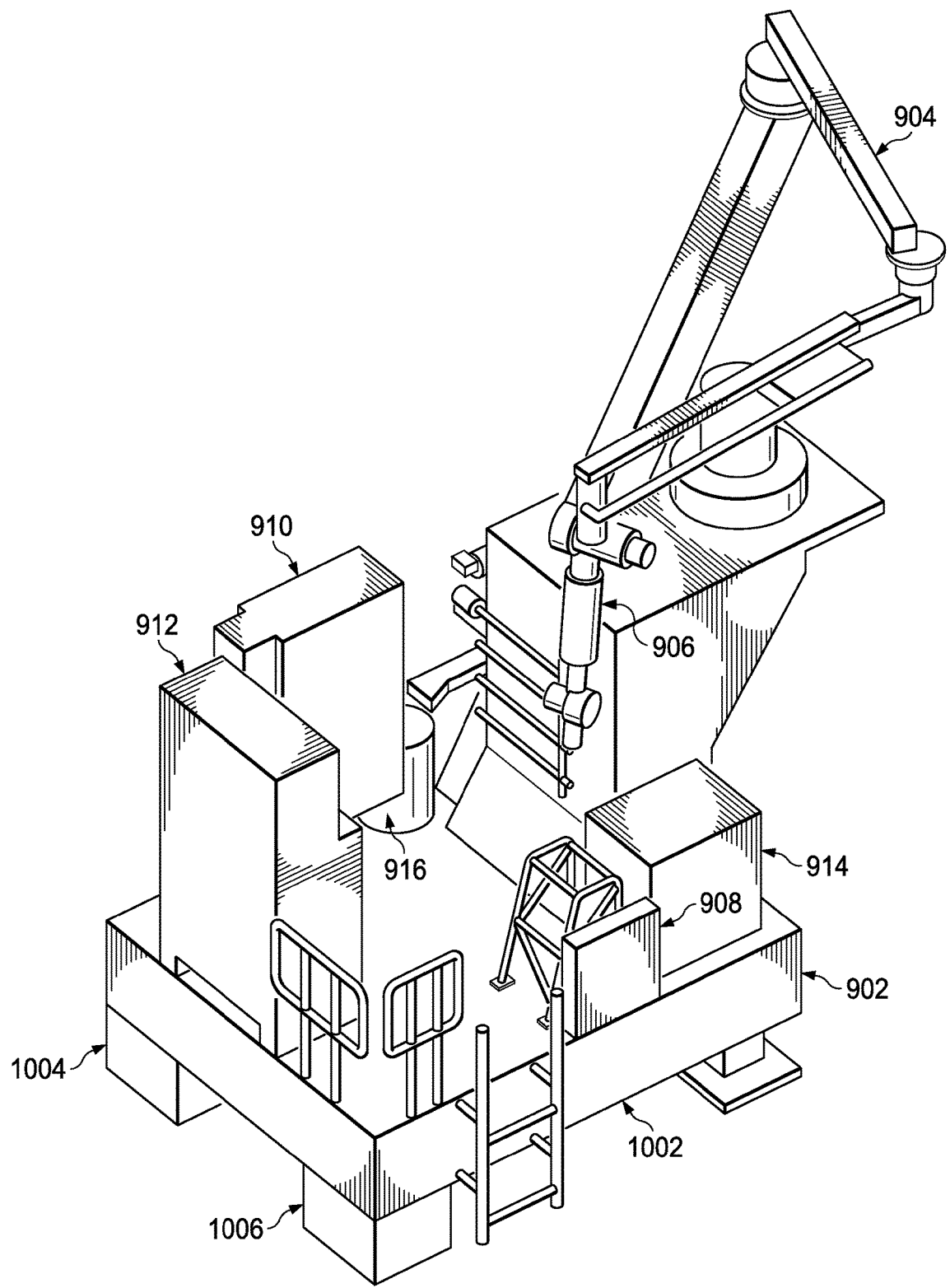
FIG. 10 is an illustration of an isometric view of a platform in accordance with an illustrative embodiment.

Turning now to FIG. 10, an illustration of an isometric view of a platform is depicted in accordance with an illustrative embodiment. As depicted, movement system 1002 of platform 900 is shown from view 10-10 in FIG. 9. Movement system 1002 may include wheels 1004 and locking mechanism 1006. Although movement system 1002 is shown with wheels 1004, movement system 1002 may be implemented using at least one of a number of wheels, a number of rails, a number of tracks, a number of sliders, a number of gliders, a number of air bearings, a number of holonomic wheels, mecanum wheels, omni wheels, poly wheels, or a number of some other type of movement device.

Platform 900 may be moved within a manufacturing system using wheels 1004 of movement system 1002. Locking mechanism 1006 may restrict movement of platform 900 when desirable. In one example, it may be desirable to restrict movement of platform 900 when a crawler robot is performing functions on a surface. In another example, it may be desirable to restrict movement of platform 900 when a crawler robot and an associated track system is moving along the surface.

Figure 11:
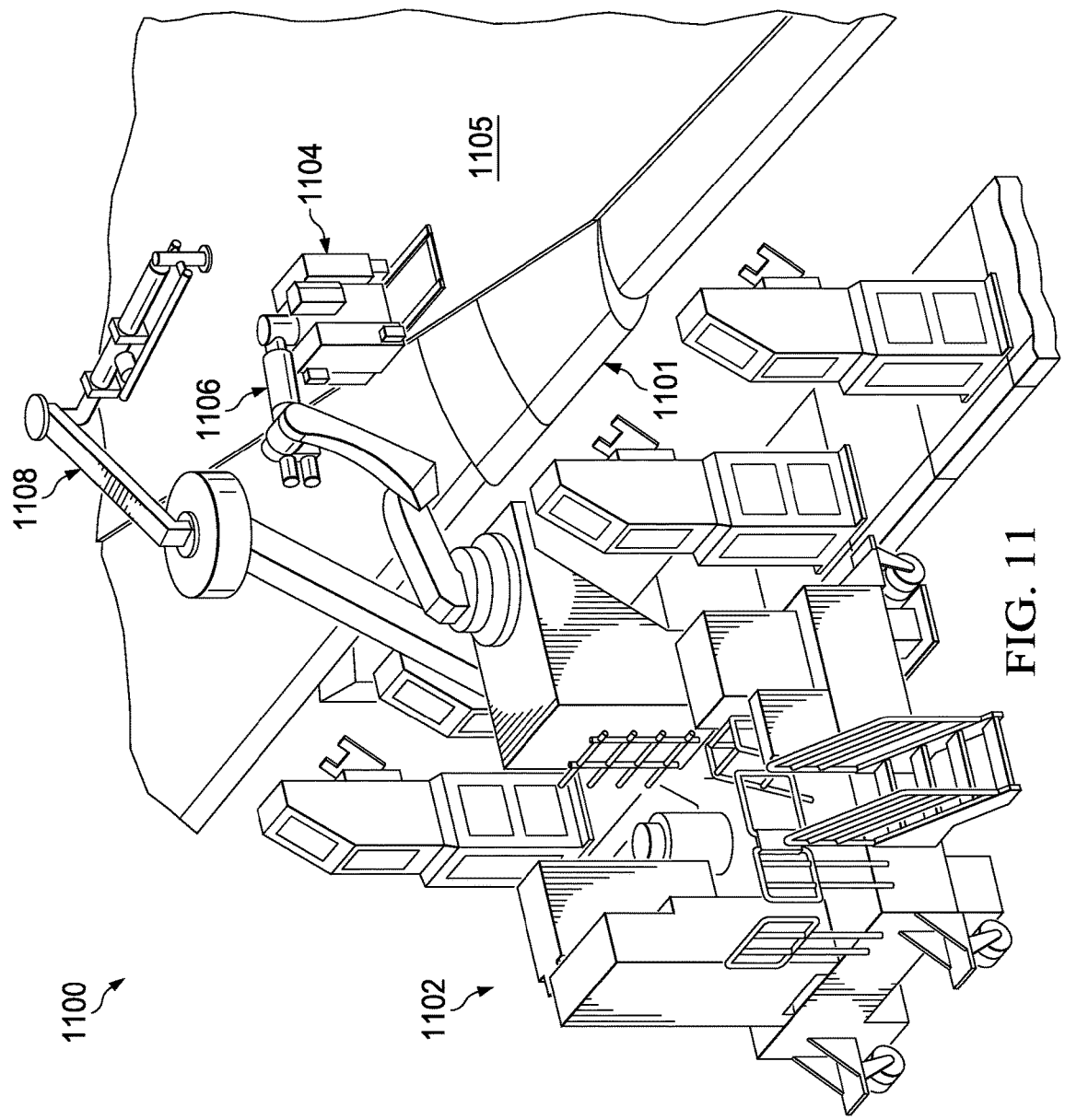
FIG. 11 is an illustration of an isometric view of a platform and a crawler robot on a surface of a structure in accordance with an illustrative embodiment.

Turning now to FIG. 11, an illustration of an isometric view of a platform and a crawler robot on a surface of a structure is depicted in accordance with an illustrative embodiment. Manufacturing environment 1100 may be a physical implementation of manufacturing environment 200 shown in block form in FIG. 2. Manufacturing environment 1100 may have wing 1101, movable platform 1102, and crawler robot 1104. Movable platform 1102 may be a physical implementation of movable platform 264 shown in block form in FIG. 2. Crawler robot 1104 may be a physical implementation of crawler robot 208 of FIG. 2. Crawler robot 1104 may move along surface 1105 of wing 1101. Movable platform 1102 may have pick and place arm 1106 and utility arm 1108. Pick and place arm 1106 may place crawler robot 1104 onto surface 1105 of wing 1101. Utility arm 1108 may move utility cables attached to crawler robot 1104.

The different components shown in FIGS. 1 and 3-11 may be combined with components in FIG. 2, used with components in FIG. 2, or a combination of the two. Additionally, some of the components in FIGS. 1 and 3-11 may be illustrative examples of how components shown in block form in FIG. 2 can be implemented as physical structures.

Figure 12:
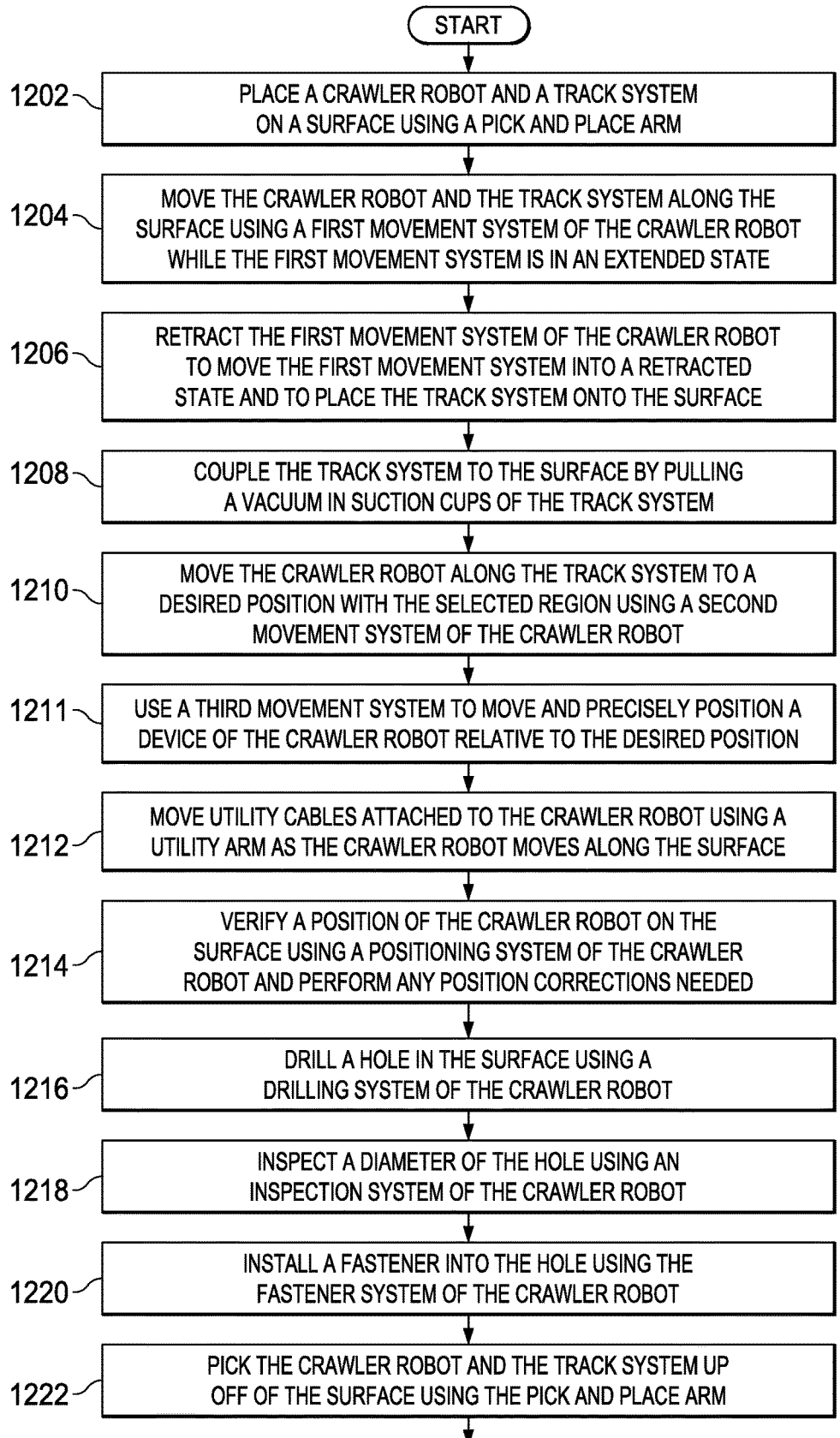
FIG. 12 is an illustration of a flowchart of a process for operating a crawler robot in accordance with an illustrative embodiment.

Turning now to FIG. 12, an illustration of a flowchart of a process for operating a crawler robot is depicted in accordance with an illustrative embodiment. The process illustrated in FIG. 12 may be implemented to operate crawler robot 208 of FIG. 2. In some illustrative examples, the process illustrated in FIG. 12 may be implemented to operate crawler robot 300 of FIGS. 3-7.

The process may begin by placing crawler robot 208 and track system 210 on surface 204 using pick and place arm 244 (operation 1202). In operation 1202, first movement system 214 of crawler robot 208 may be in extended state 215 such that when crawler robot 208 and track system 210 are placed on surface 204, track system 210 does not contact surface 204.

The process may next move crawler robot 208 and track system 210 along surface 204 using first movement system 214 of crawler robot 208 while first movement system 214 is in extended state 215 (operation 1204). In operation 1204, crawler robot 208 may be moved until it is within a selected region on surface 204. Operation 1204 may be performed to roughly move and position crawler robot 208 relative to surface 204.

The process may next retract first movement system 214 of crawler robot 208 to move first movement system 214 into retracted state 217 and to place track system 210 onto surface 204 (operation 1206). By retracting first movement system 214 of crawler robot 208 in operation 1206, track system 210 may be placed in contact with surface 204.

The process may then couple track system 210 to surface 204 by pulling a vacuum in suction cups 228 of track system 210 (operation 1208). The process may then move crawler robot 208 along track system 210 to desired position 239 with selected region 273 using second movement system 216 of crawler robot 208 (operation 1210). Operation 1210 may be performed to more precisely move and position crawler robot 208 to desired position 239 relative to surface 204. In operation 1210, crawler robot 208 may be moved until it is within selected tolerances of desired position 239 on surface 204.

In one illustrative example, desired position 239 in operation 1210 may be a position that is selected such that at least one of positioning system 218, drilling system 220, fastener system 224, and inspection system 222 may perform a function on surface 204 at the desired position. Thereafter, crawler robot 208 may use third movement system 225 to move and precisely position a device of crawler robot 208 relative to desired position 239 (operation 1211). In operation 1211, the device may be, for example, without limitation, drilling system 220, fastener system 224, or inspection system 222. The device may be precisely positioned using third movement system 225 such that the device may perform a function or selected operation.

The process may move utility cables 255 attached to crawler robot 208 using utility arm 252 as crawler robot 208 moves along surface 204 (operation 1212). In this illustrative example, operation 1212 may be performed while at least one of operation 1204 or operation 1210 is being performed. The process may then verify a position of crawler robot 208 on surface 204 using positioning system 218 of crawler robot 208 and perform any position corrections needed (operation 1214). In some cases, operation 1214 may be performed as part of operation 1210 described above.

The process may next drill hole 202 in surface 204 using drilling system 220 of crawler robot 208 (operation 1216). In operation 1216, hole 202 may take the form of a conical hole, a cylindrical hole, a countersink, a counterbore, or some other type of hole.

The process may then inspect a diameter of hole 202 using inspection system 222 of crawler robot 208 (operation 1218). In some cases, when hole 202 takes the form of a countersink, inspection system 222 may be used to inspect at least one of a diameter, a countersink depth, a countersink diameter, a grip length, or some other parameter for hole 202.

The process may then install fastener 240 into hole 202 using fastener system 224 of crawler robot 208 (operation 1220). In operation 1220, fastener system 224 may insert fastener 240 into hole 202 to install fastener 240 in one illustrative example. The process may then pick crawler robot 208 and track system 210 up off of surface 204 using pick and place arm 244 (operation 1222), with the process terminating thereafter.

Figure 13:
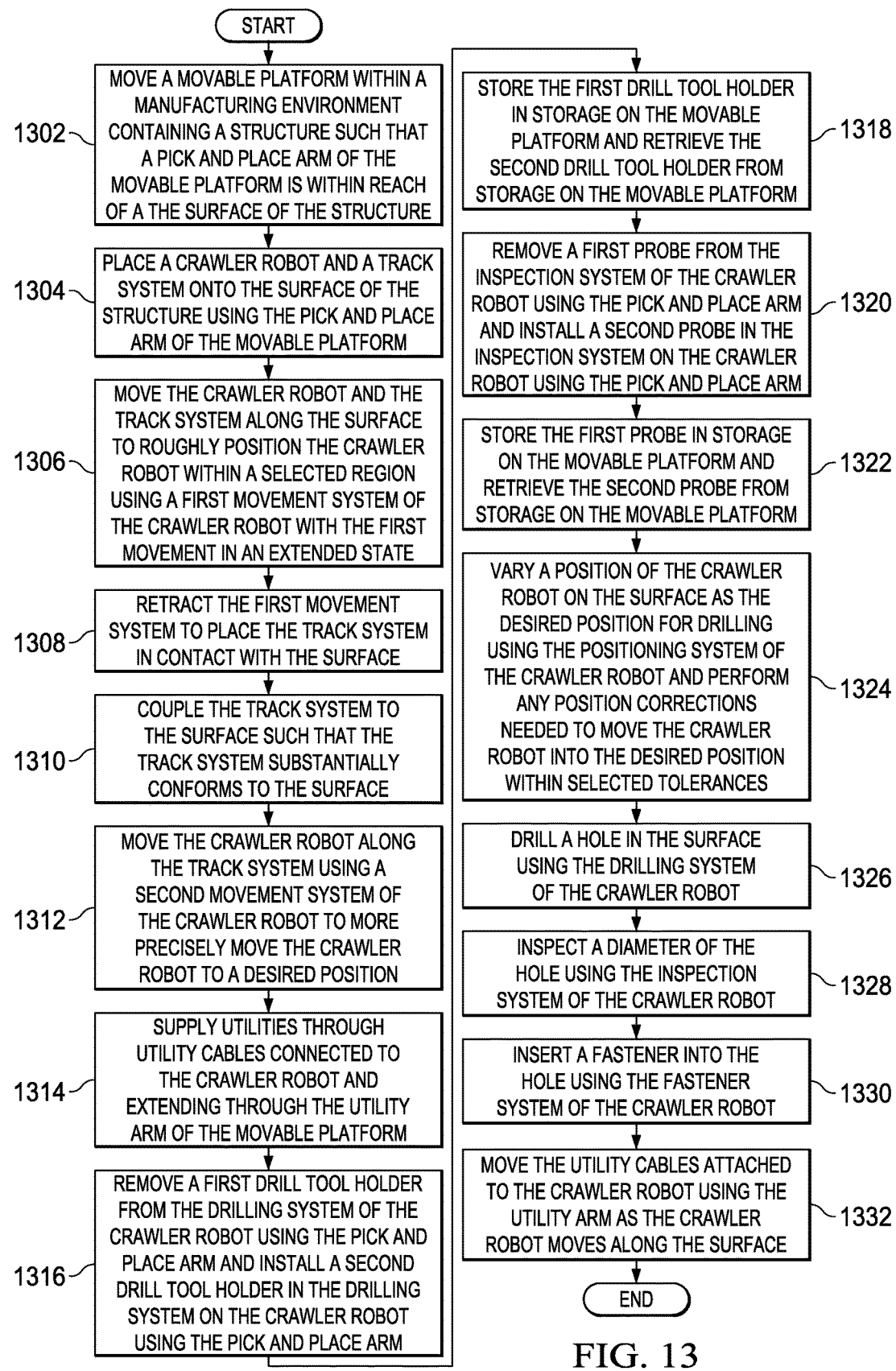
FIG. 13 is an illustration of a flowchart of a process for managing a crawler robot and a track system using a movable platform in accordance with an illustrative embodiment.

Turning now to FIG. 13, an illustration of a flowchart of a process for managing a crawler robot and a track system using a movable platform is depicted in accordance with an illustrative embodiment. The process illustrated in FIG. 13 may be implemented to operate crawler robot 208 using movable platform 264 of FIG. 2. In some illustrative examples, the process illustrated in FIG. 13 may be implemented to operate crawler robot 1104 using movable platform 1102 of FIG. 11.

The process may begin by moving movable platform 264 within manufacturing environment 200 containing structure 206 such that pick and place arm 244 of movable platform 264 is within reach of surface 204 of structure 206 (operation 1302). The process may then place crawler robot 208 and track system 210 onto surface 204 of structure 206 using pick and place arm 244 of movable platform 264 (operation 1304).

The process may then move crawler robot 208 and track system 210 along surface 204 to roughly position crawler robot 208 within a selected region using first movement system 214 of crawler robot 208 with first movement system 214 in extended state 215 (operation 1306). The process may then retract first movement system 214 to place track system 210 in contact with surface 204 (operation 1308).

Then, track system 210 may be coupled to surface 204 such that track system 210 substantially conforms to surface 204 (operation 1310). In some illustrative examples, coupling track system 210 to surface 204 comprises adhering track system 210 to surface 204 by pulling a vacuum in suction cups 228 of track system 210. The process may then move crawler robot 208 along track system 210 using second movement system 216 of crawler robot 208 to more precisely move crawler robot 208 to desired position 239 (operation 1312).

The process may then supply utilities 257 through utility cables 255 connected to crawler robot 208 and extending through utility arm 252 of movable platform 264 (operation 1314). The process may remove a first drill tool holder from drilling system 220 of crawler robot 208 using pick and place arm 244 and install a second drill tool holder in drilling system 220 on crawler robot 208 using pick and place arm 244 (operation 1316).

The process may then store the first drill tool holder in storage 248 on movable platform 264 and retrieve the second drill tool holder from storage 248 on movable platform 264 (operation 1318). The process may then remove a first probe from inspection system 222 of crawler robot 208 using pick and place arm 244 and install a second probe in inspection system 222 on crawler robot 208 using pick and place arm 244 (operation 1320). The process may then store the first probe in storage 248 on movable platform 264 and retrieve the second probe from storage 248 on movable platform 264 (operation 1322).

The process may then vary a position of crawler robot 208 on surface 204 as desired position 239 for drilling using positioning system 218 of crawler robot 208 and perform any position corrections needed to move crawler robot 208 into desired position 239 within selected tolerances (operation 1324). Operation 1324 may include, for example, without limitation, repeating the steps of using metrology system 236 to determine whether crawler robot 208 is positioned within selected tolerances of desired position 239 and moving crawler robot 208 relative to track system 210 using second movement system 216 towards desired position 239 until crawler robot 208 is positioned within selected tolerances of desired position 239.

The process may then drill hole 202 in surface 204 using drilling system 220 of crawler robot 208 (operation 1326). Next, the process may inspect a diameter of hole 202 using inspection system 222 of crawler robot 208 (operation 1328). The process may then insert fastener 240 into hole 202 using fastener system 224 of crawler robot 208 (operation 1330). The process may move utility cables 255 attached to crawler robot 208 using utility arm 252 as crawler robot 208 moves along surface 204 (operation 1332). Operation 1332 may be performed during at least one of operation 1306, 1312, or 1324. Further, operation 1324 may be repeated between operation 1326 and operation 1328 and between operation 1328 and operation 1330 in some illustrative examples. The process terminates thereafter.

Figure 14:
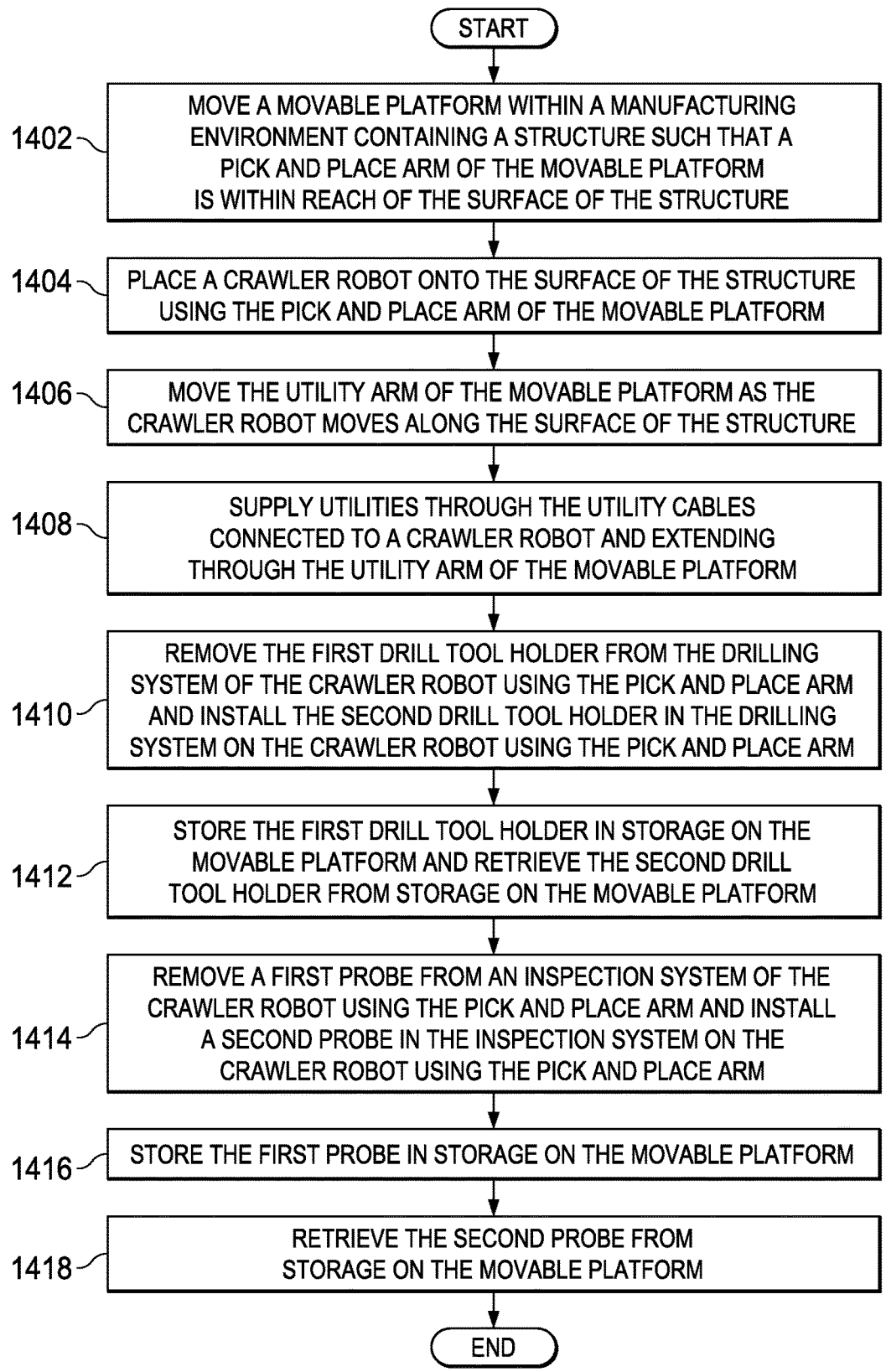
FIG. 14 is an illustration of a flowchart of a process for operating a movable platform in accordance with an illustrative embodiment.

Turning now to FIG. 14, an illustration of a flowchart of a process for operating a movable platform is depicted in accordance with an illustrative embodiment. The process may begin by moving movable platform 264 within manufacturing environment 200 containing structure 206 such that pick and place arm 244 of movable platform 264 is within reach of surface 204 of structure 206 (operation 1402). The process may then place crawler robot 208 onto surface 204 of structure 206 using pick and place arm 244 of movable platform 264 (operation 1404). The process may then move utility arm 252 of movable platform 264 as crawler robot 208 moves along surface 204 of structure 206 (operation 1406). The process may then supply utilities 257 through utility cables 255 connected to crawler robot 208 and extending through utility arm 252 of movable platform 264 (operation 1408).

The process may then remove a first drill tool holder from drilling system 220 of crawler robot 208 using pick and place arm 244 and install a second drill tool holder in drilling system 220 on crawler robot 208 using pick and place arm 244 (operation 1410). The process may then store the first drill tool holder in storage 248 on movable platform 264 and retrieve the second drill tool holder from storage 248 on movable platform 264 (operation 1412). The process may then remove a first probe from inspection system 222 of crawler robot 208 using pick and place arm 244 and install a second probe in inspection system 222 on crawler robot 208 using the pick and place arm 244 (operation 1414). The process may store the first probe in storage 248 on movable platform 264 (operation 1416). The process may then retrieve the second probe from storage 248 on movable platform 264 (operation 1418). The process terminates thereafter.

Figure 15:
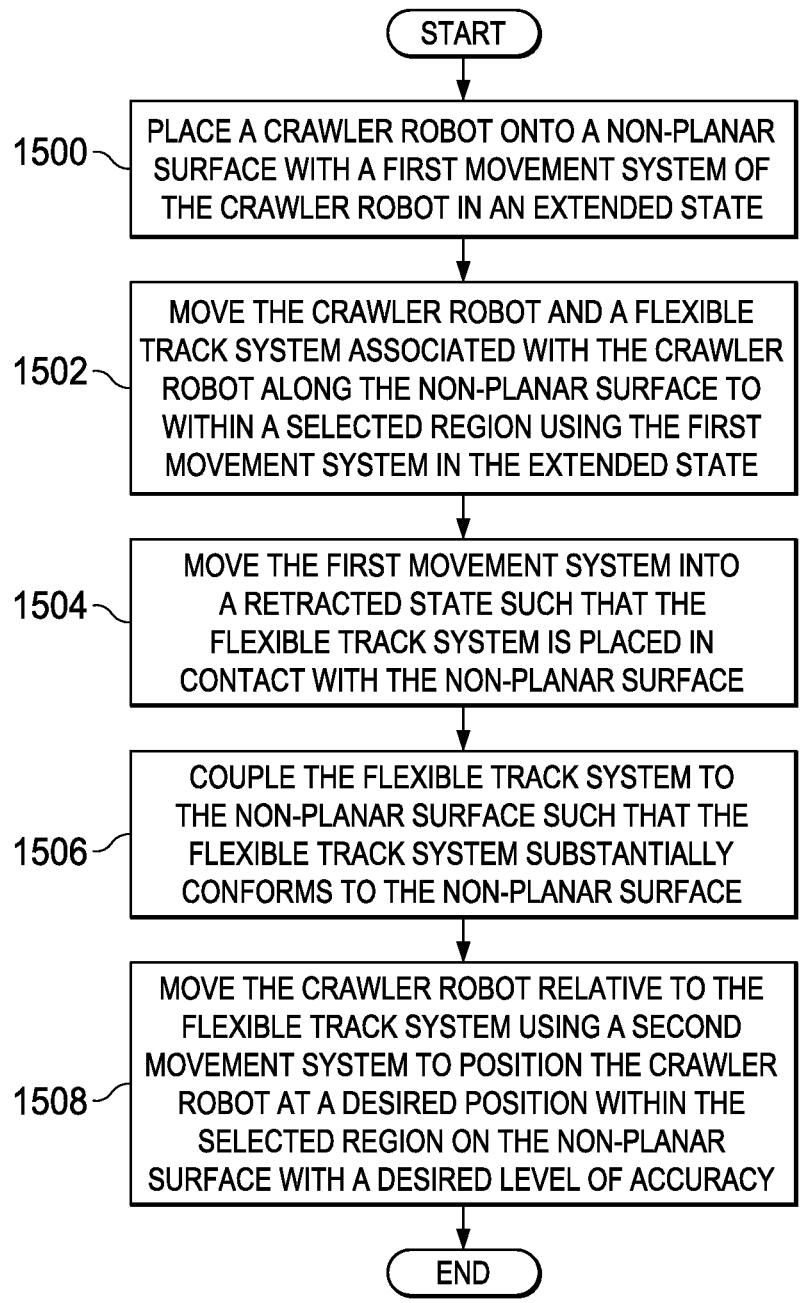
FIG. 15 is a an illustration of a flowchart of a process for positioning a crawler robot relative to a surface in accordance with an illustrative embodiment.

With reference now to FIG. 15, an illustration of a flowchart of a process for positioning a crawler robot relative to a surface is depicted in accordance with an illustrative embodiment. The process illustrated in FIG. 15 may be performed to position crawler robot 208 relative to surface 204 of structure 206 from FIG. 6.

The process may begin by placing crawler robot 208 onto non-planar surface 230 with first movement system 214 of crawler robot 208 in extended state 215 (operation 1500). Next, crawler robot 208 and flexible track system 229 associated with crawler robot 208 may be moved along non-planar surface 230 to within a selected region using first movement system 214 in extended state 215 (operation 1502). Operation 1502 may include performing any verifications and position corrections for the position of crawler robot 208 relative to non-planar surface 230 needed to position crawler robot 208 within the selected region.

Thereafter, first movement system 214 is moved into retracted state 217 such that flexible track system 229 is placed in contact with non-planar surface 230 (operation 1504). Flexible track system 229 is coupled to non-planar surface 230 such that flexible track system 229 substantially conforms to non-planar surface 230 (operation 1506). Next, crawler robot 208 is moved relative to flexible track system 229 using second movement system 216 to position crawler robot 208 at desired position 239 within the selected region on non-planar surface 230 with a desired level of accuracy (operation 1508), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented. For example, crawler robot 208 may be placed on surface 204 in another fashion other than operation 1202. For example, crawler robot 208 may be placed on surface 204 by an operator.

Figure 16:
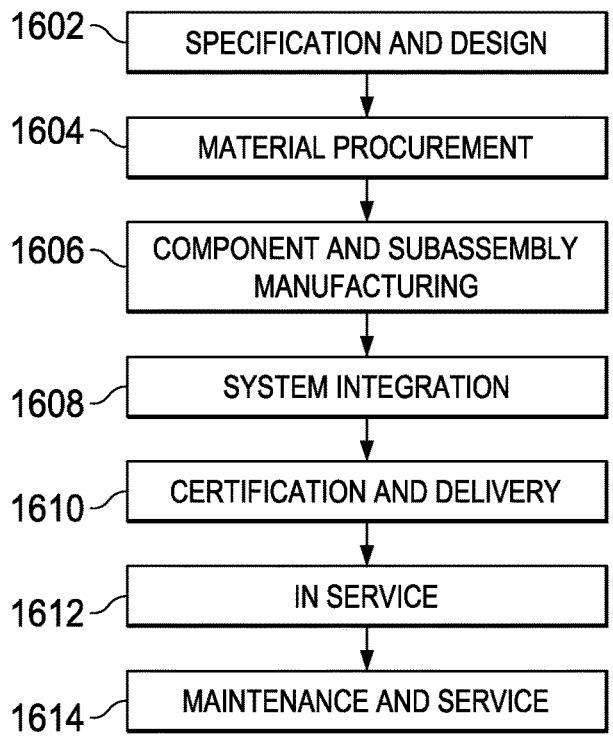
FIG. 16 is an illustration of an aircraft manufacturing and service method in the form of a block diagram in accordance with an illustrative embodiment.
Figure 17:
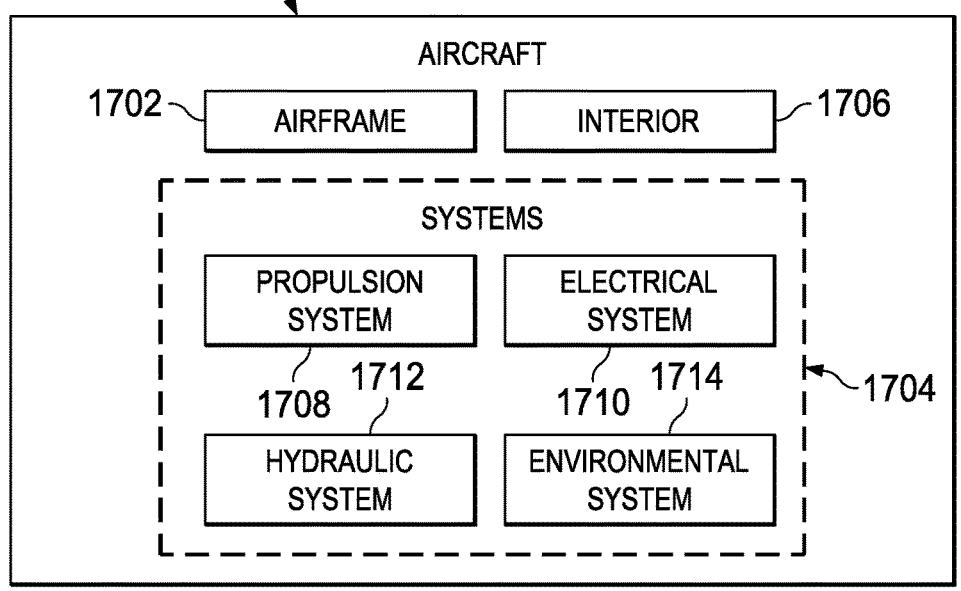
FIG. 17 is an illustration of an aircraft in the form of a block diagram in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in the form of a block diagram in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in the form of a block diagram in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. One or more illustrative embodiments may be used during component and subassembly manufacturing 1606. For example, crawler robot 208 in FIG. 2 may be used during component and subassembly manufacturing 1606. Further, crawler robot 208 may also be used to perform replacements during maintenance and service 1614. For example, aircraft 1700 may have crawler robot 208 drill holes during maintenance and service 1614 for aircraft 1700.

The present disclosure may provide a crawler robot. The crawler robot may comprise a first movement system and a second movement system. The first movement system may be configured to move the crawler robot and a track system along the surface. The second movement system may be configured to move the crawler robot along the track system on the surface.

The crawler robot may provide drilling processes without operator placement. The crawler robot may be initially placed by a pick and place arm. The first movement system may then move the crawler robot and the track system. This may result in drilling operations which may use at least one of less time and fewer resources. Further, the crawler robot may perform a plurality of functions. For example, the crawler robot may perform at least one of drilling, inspection, positioning, and fastener placement.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A crawler robot comprising:
a first movement system configured to move the crawler robot and a the track system along a surface when the first movement system is in an extended state and transitions to a retracted state such that the first movement system is removed from the surface, wherein the crawler robot is configured to perform an operation on the surface; and
a second movement system configured to move the crawler robot along the track system on the surface when the first movement system is in the retracted state.

2. The crawler robot of claim 1 further comprising:
a drilling system.

3. The crawler robot of claim 2 further comprising:
an inspection system configured to inspect a hole drilled by the drilling system.

4. The crawler robot of claim 2 further comprising:
a fastener system configured to insert a fastener into a hole drilled by the drilling system.

5. The crawler robot of claim 2, wherein the drilling system comprises an interchangeable tool holder.

6. The crawler robot of claim 3, wherein the inspection system comprises an interchangeable probe.

7. The crawler robot of claim 1 further comprising:
a positioning system configured to identify a desired position of the crawler robot on the surface.

8. The crawler robot of claim 7, wherein the positioning system is configured to identify the desired position of the crawler robot based on index features of the surface.

9. The crawler robot of claim 1, wherein each of the first movement system and the second movement system comprises at least one of retractable wheels, rollers, gliders, air bearings, holonomic wheels, rails, or tracks.

10. The crawler robot of claim 1, wherein steering direction for the crawler robot is provided by at least one of a human operator, a controller associated with the crawler robot, or a system controller.

11. The crawler robot of claim 10, wherein the crawler robot is configured to steer itself.

12. An apparatus comprising:
a track system; and
a crawler robot comprising a first movement system configured to move the crawler robot and the track system along a surface of a structure when the first movement system is in an extended state and transitions to a retracted state such that the first movement system is removed from the surface and a second movement system is placed on the surface and is configured to move the crawler robot along the track system on the surface, wherein the crawler robot is configured to perform an operation on the surface.

13. The apparatus of claim 12, wherein the track system is a flexible track system configured to flex to substantially conform to a contour of the surface when the surface is a non-planar surface.

14. The apparatus of claim 12 further comprising:
a crawler support configured to provide utilities to the crawler robot.

15. The apparatus of claim 14, wherein the crawler support comprises:
a movable platform;
a movement system configured to move the movable platform relative to the structure within a manufacturing environment;
a pick and place arm for at least one of placing the crawler robot and the track system on the surface of the structure or removing the crawler robot and the track system from the surface of the structure; and
a utility arm configured to provide the utilities to the crawler robot.

16. The apparatus of claim 15, wherein steering direction for the movable platform is provided by at least one of a human operator, a controller associated with the movable platform, or a system controller.

17. The apparatus of claim 16, wherein the movable platform is configured to steer itself.

18. The apparatus of claim 12, wherein the operation comprises installing a fastener, and wherein the crawler robot further comprises:
a drilling system;
an inspection system configured to inspect a hole drilled by the drilling system; and
a fastener system configured to insert the fastener into the hole drilled by the drilling system.

19. A method for installing a fastener in a surface of a structure, the method comprising:
moving a crawler robot and a track system along the surface to position the crawler robot within a selected region on the surface using a first movement system while the first movement system is in an extended state, wherein the crawler robot is configured to install the fastener in the surface of the structure;
transitioning the first movement system to a retracted state such that the first movement system is removed from the surface and the track system is in contact with the surface;
coupling the track system to the surface; and
moving the crawler robot relative to the track system to precisely move the crawler robot to a desired position within the selected region.

20. The method of claim 19 further comprising:
placing the crawler robot and the track system on the surface of the structure using a pick and place arm.

21. The method of claim 19, wherein coupling the track system to the surface comprises:
coupling the track system to the surface in which the surface is a non-planar surface and the track system is a flexible track system configured to flex to substantially conform to a contour of the non-planar surface.

22. The method of claim 19, wherein moving the crawler robot relative to the track system comprises:
moving the crawler robot relative to the track system using a second movement system that provides a finer level of positioning compared to the first movement system.

23. The method of claim 19 further comprising:
performing at least one of drilling a hole, inspecting the hole, and installing the fastener in the hole while the crawler robot is positioned at the desired position on the surface of the structure.

24. A method for moving a crawler robot and a track system, the method comprising:
moving the crawler robot and the track system along a surface using a first movement system of the crawler robot when the first movement system is in an extended state, wherein the crawler robot is configured to perform an operation on the surface;
coupling the track system to the surface;
retracting the first movement system of the crawler robot to a retracted state such that the first movement system is removed from the surface; and
moving the crawler robot along the track system using a second movement system of the crawler robot.

25. The method of claim 24 further comprising:
positioning the crawler robot on the surface using a positioning system of the crawler robot.

26. The method of claim 24 further comprising:
drilling a hole in the surface using a drilling system of the crawler robot.

27. The method of claim 26 further comprising:
inspecting a diameter of the hole using an inspection system of the crawler robot.

28. The method of claim 27 further comprising:
inserting a fastener into the hole using a fastener system of the crawler robot.

29. The method of claim 24, wherein coupling the track system to the surface comprises pulling a vacuum in suction cups of the track system.

30. The method of claim 24 further comprising:
placing the crawler robot and the track system on the surface using a pick and place arm.

31. The method of claim 24 further comprising:
moving utility cables attached to the crawler robot using a utility arm as the crawler robot moves along the surface.

32. The method of claim 24 further comprising:
steering the crawler robot.

* * * * *